(12) United States Patent
Nanba

(10) Patent No.: US 8,437,090 B2
(45) Date of Patent: May 7, 2013

(54) ZOOM LENS AND IMAGE PICKUP APPARATUS INCLUDING THE SAME

(75) Inventor: Norihiro Nanba, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 12/844,584

(22) Filed: Jul. 27, 2010

(65) Prior Publication Data
US 2011/0032402 A1 Feb. 10, 2011

(30) Foreign Application Priority Data
Aug. 6, 2009 (JP) ................................. 2009-183428

(51) Int. Cl.
*G02B 15/14* (2006.01)

(52) U.S. Cl.
USPC .......................................... 359/695; 359/684

(58) Field of Classification Search .................. 359/686, 359/684, 695
See application file for complete search history.

(56) References Cited

U.S. PATENT DOCUMENTS 6,449,433 B2 9/2002 Hagimori et al.
2009/0116120 A1* 5/2009 Saruwatari .................... 359/686

FOREIGN PATENT DOCUMENTS

JP 2004-117826 A 4/2004

* cited by examiner

*Primary Examiner* — Alicia M Harrington
(74) *Attorney, Agent, or Firm* — Canon U.S.A., Inc. IP Division

(57) ABSTRACT

A zoom lens includes, from an object side to an image side, first to fifth lens units having positive, negative, positive, negative, and positive refractive powers. A distance between the first and second lens units is longer, a distance between the second and third lens units is shorter, and a distance between the fourth and fifth lens units is longer at a telephoto end than at a wide angle end, and a distance between the third and fourth lens units differs between the telephoto end and the wide angle end. Focal lengths of the first and fourth lens units and the entire zoom lens at the wide angle end, a moving amount of the first lens unit during zooming, and a distance from a lens surface closest to the object side in the first lens unit to an image plane at the wide angle end are set properly.

15 Claims, 21 Drawing Sheets

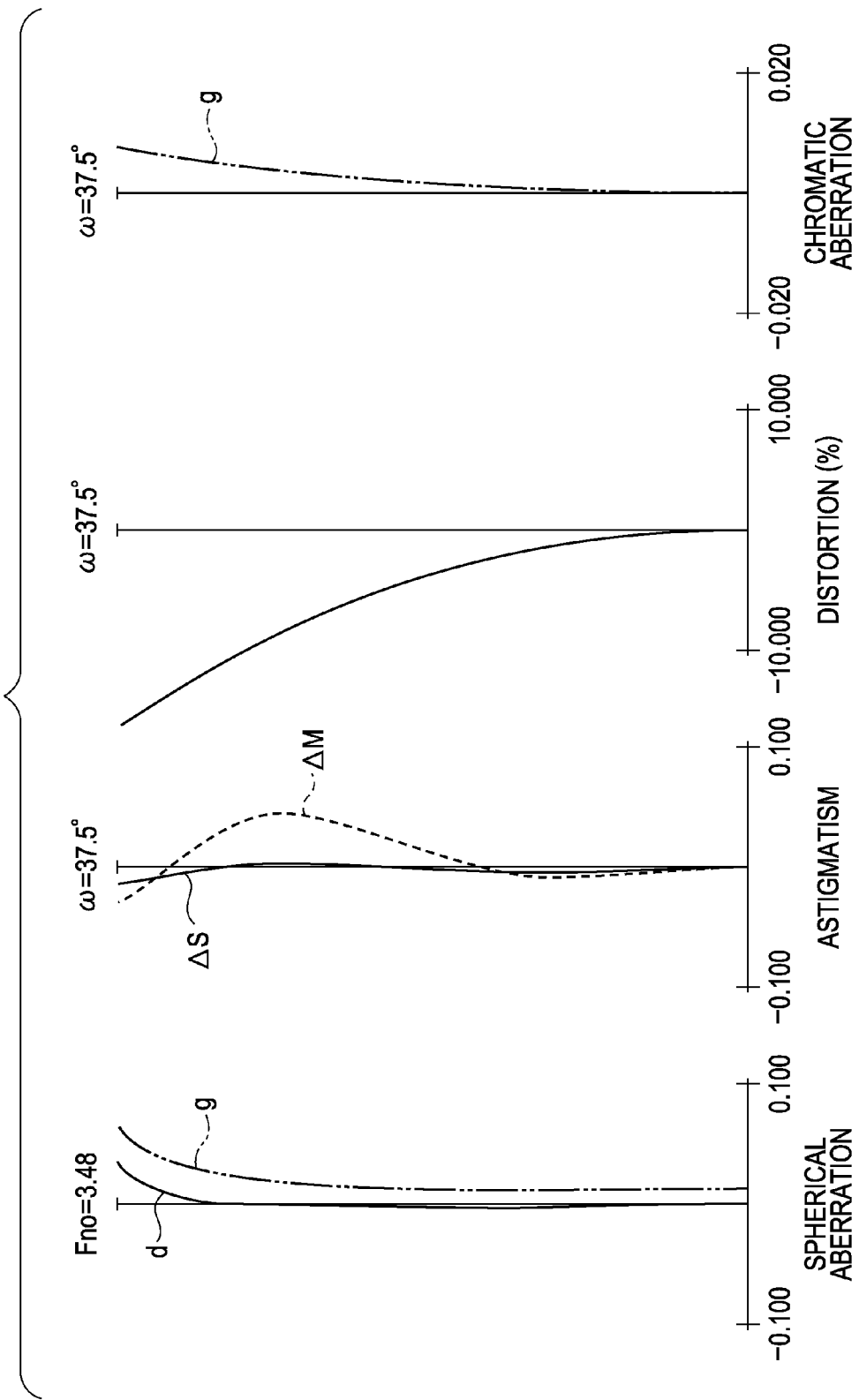

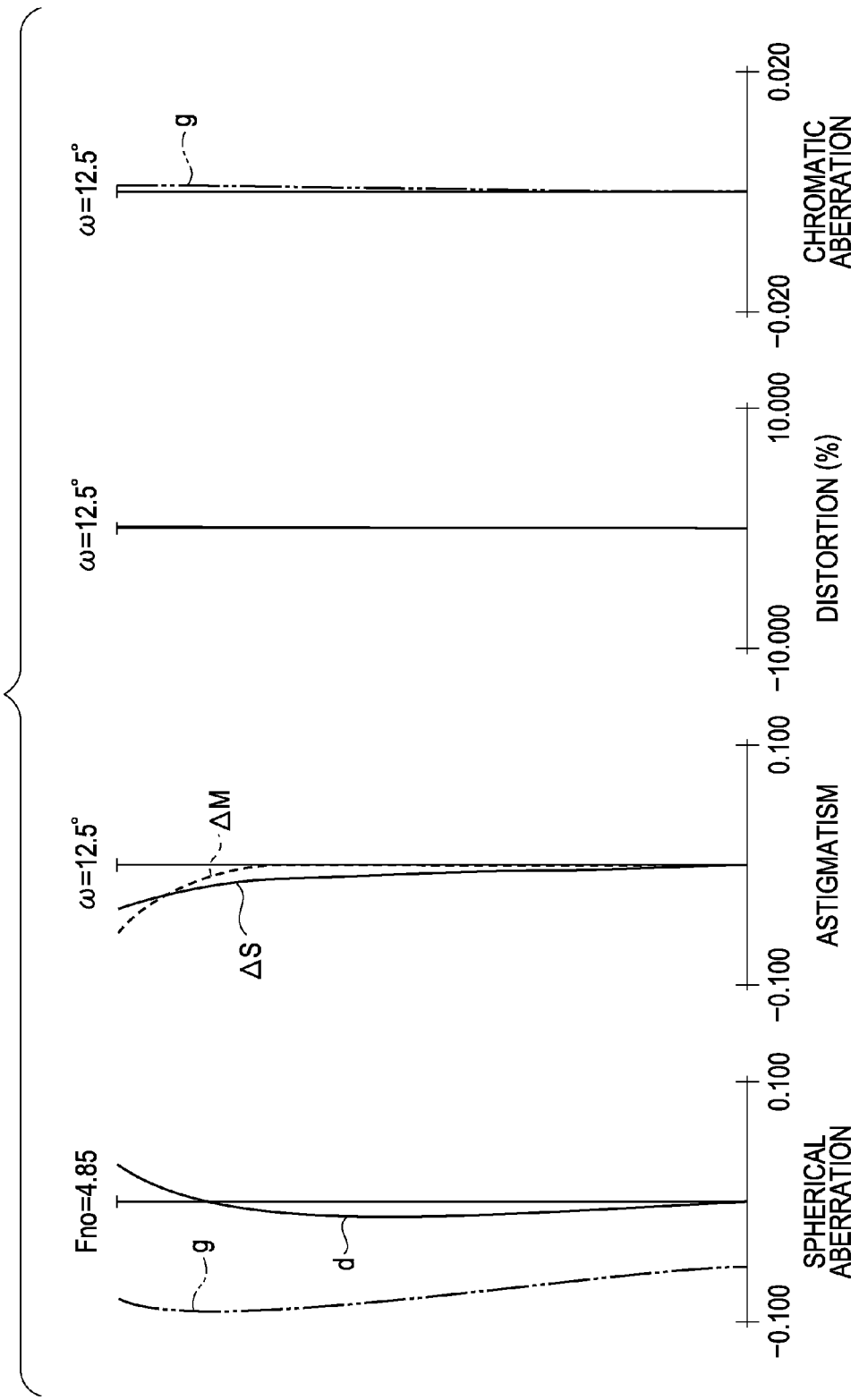

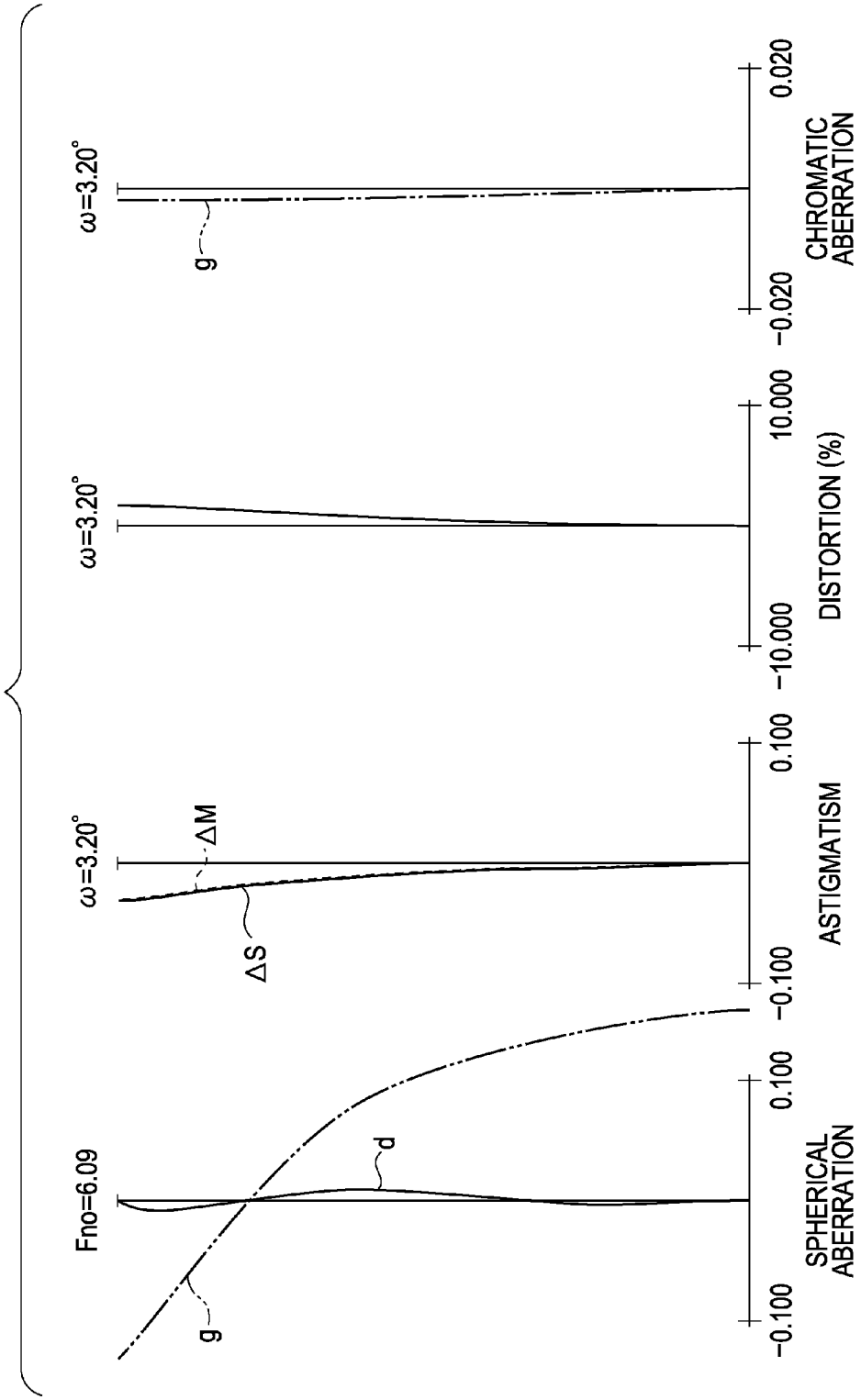

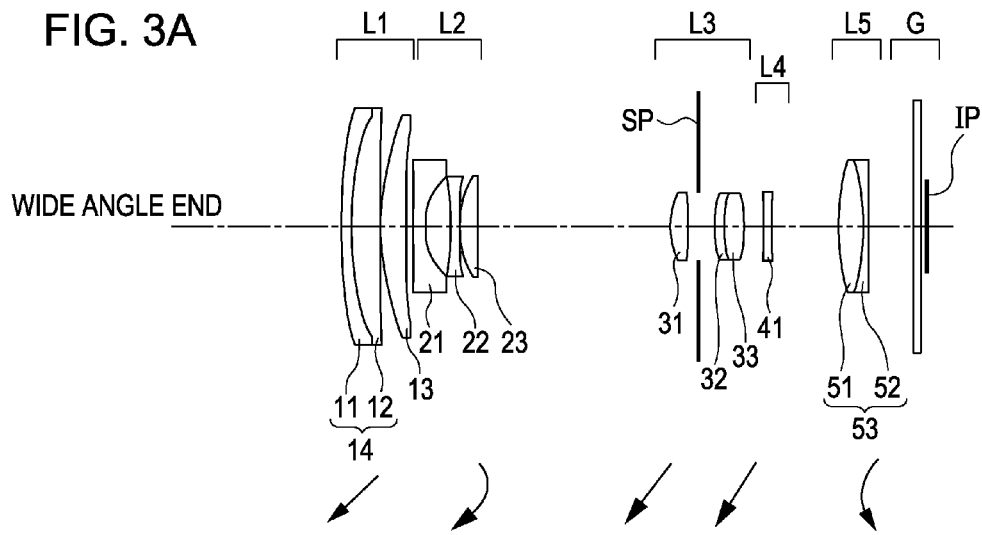
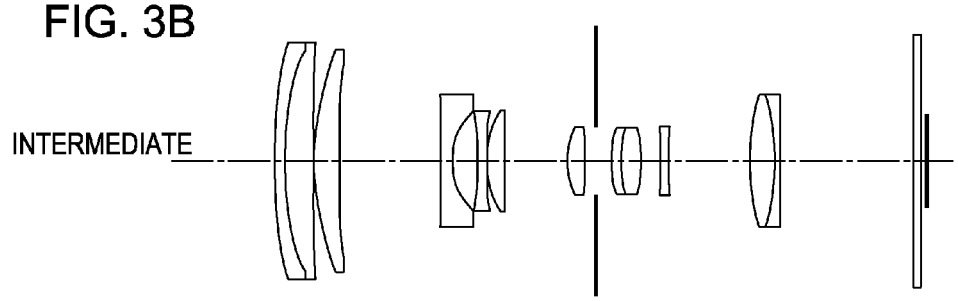
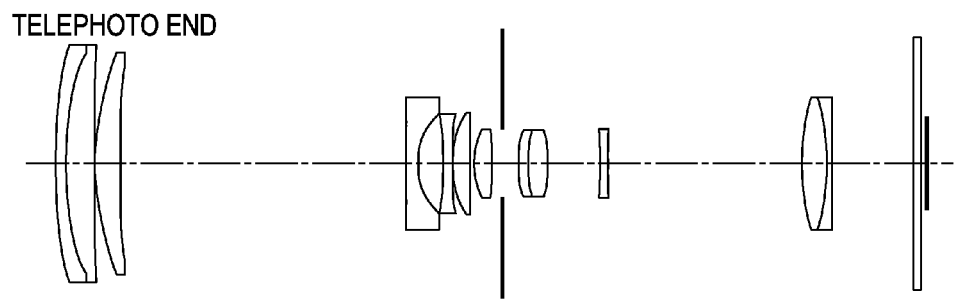

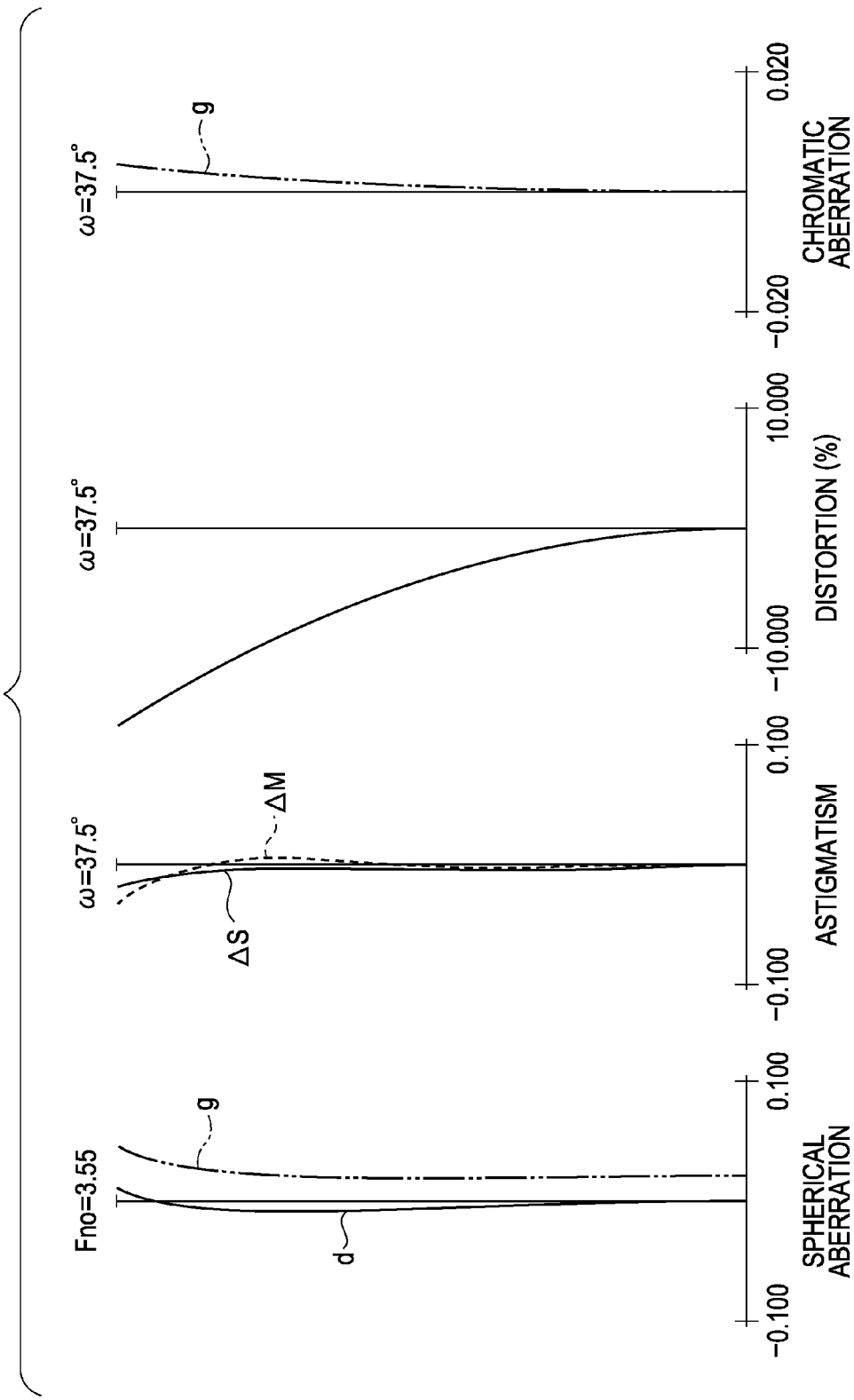

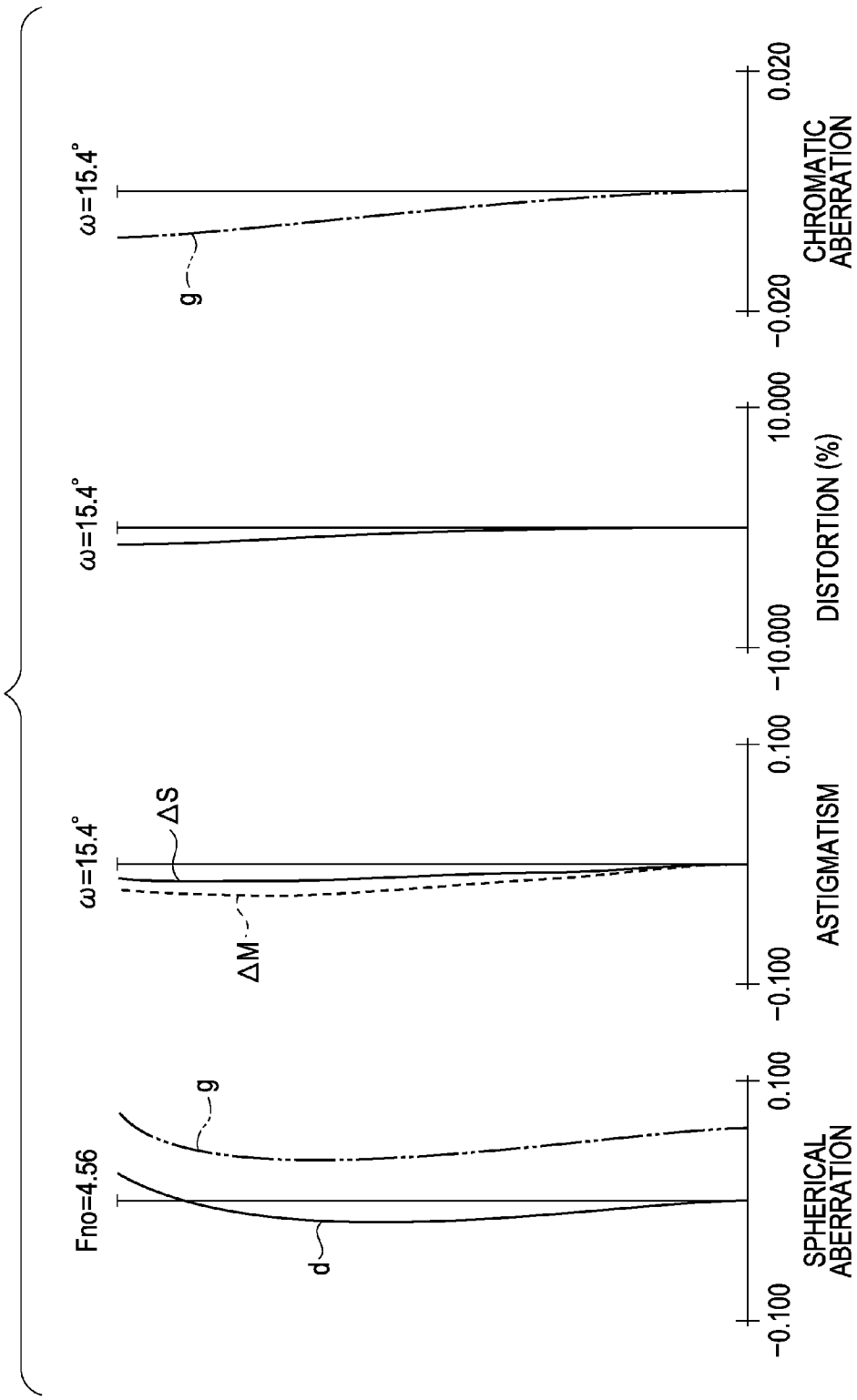

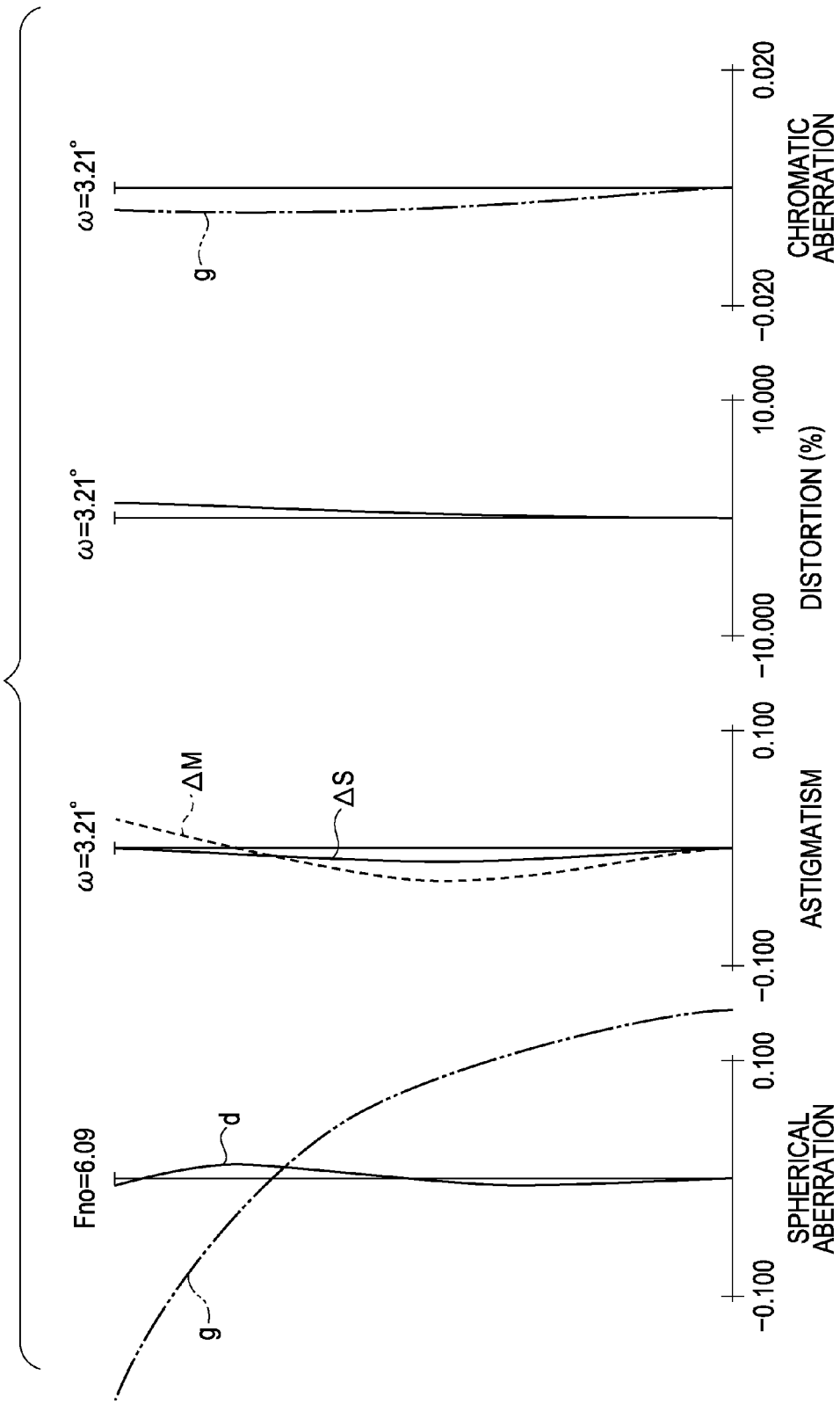

WIDE ANGLE END

INTERMEDIATE

TELEPHOTO END

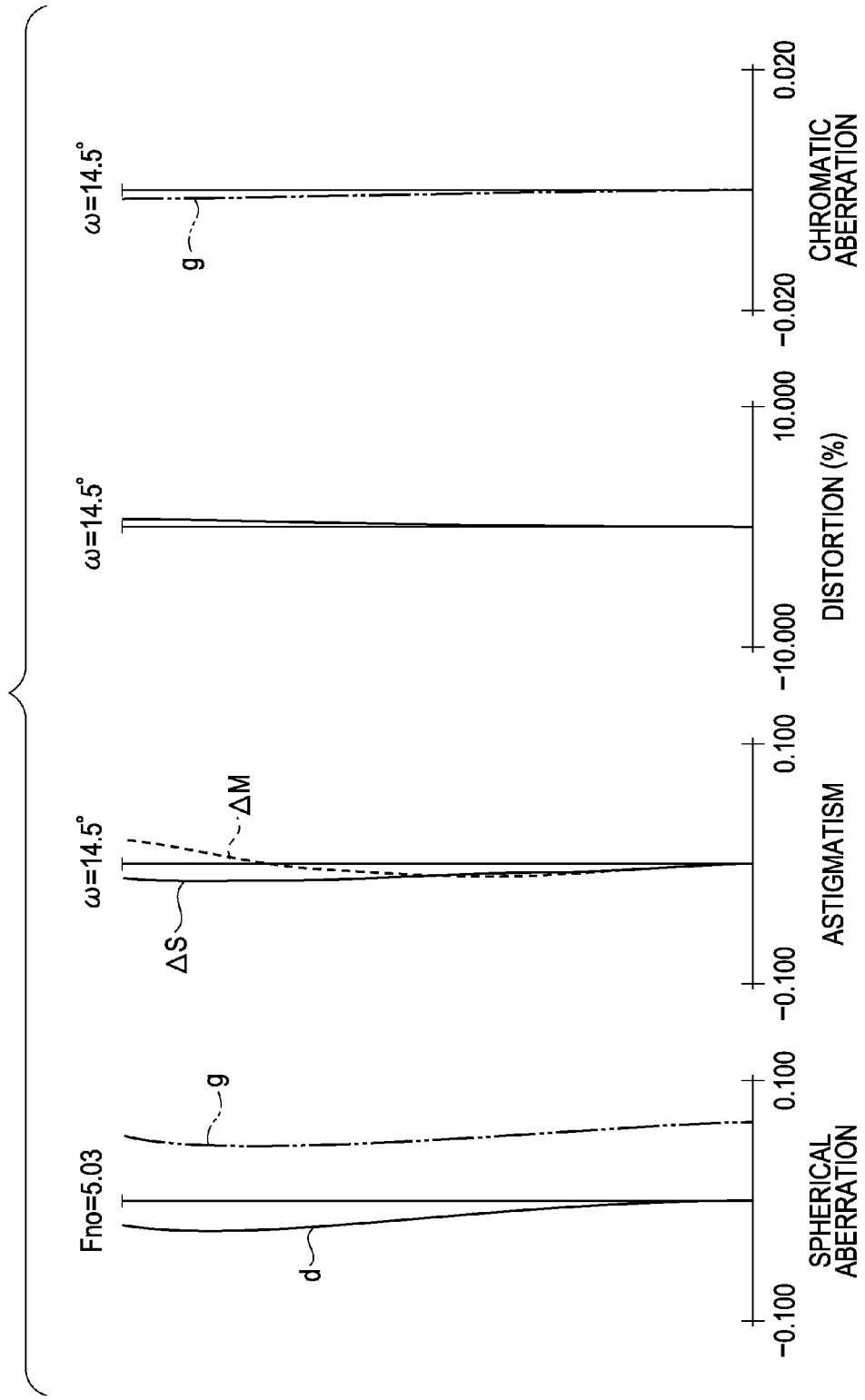

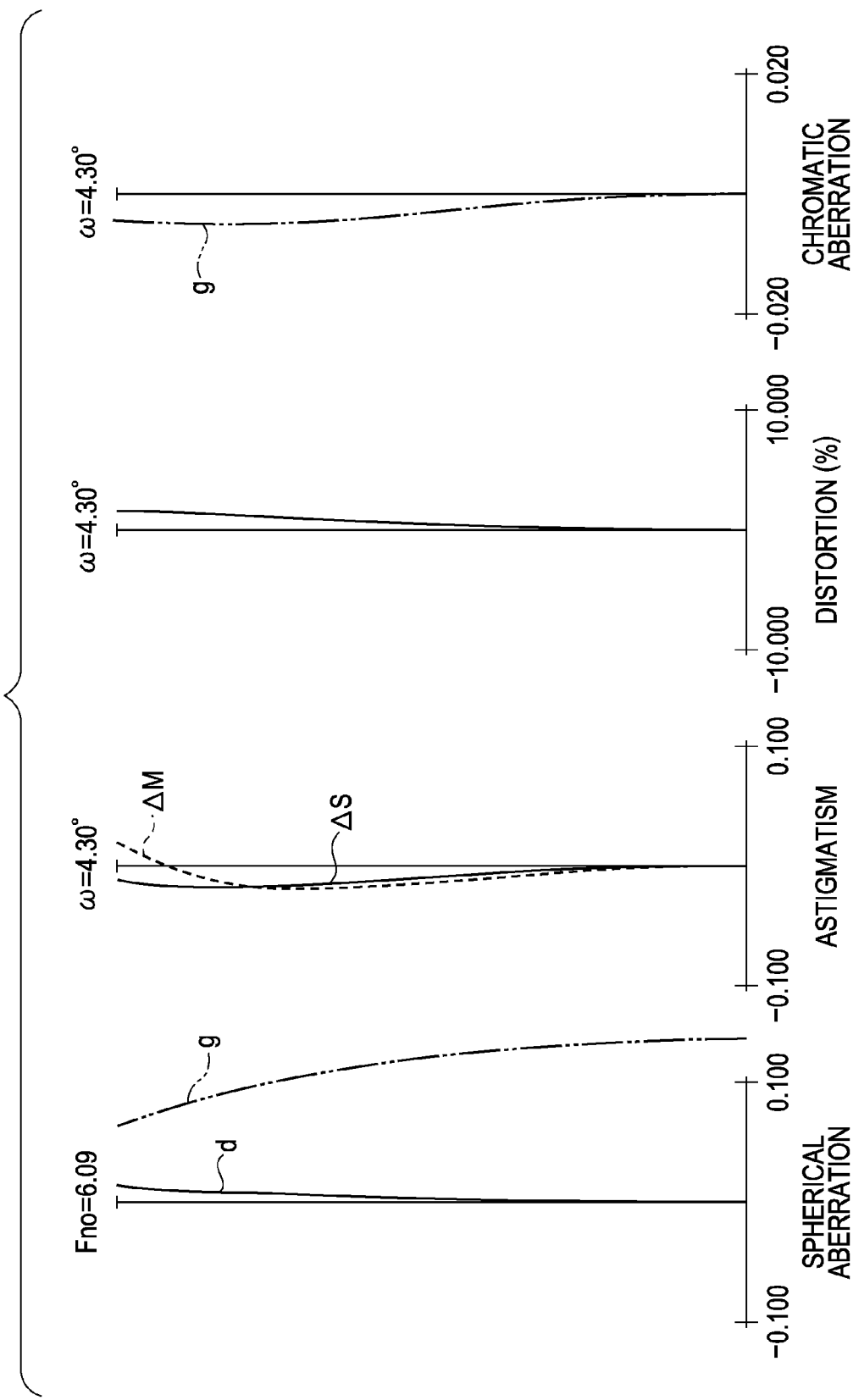

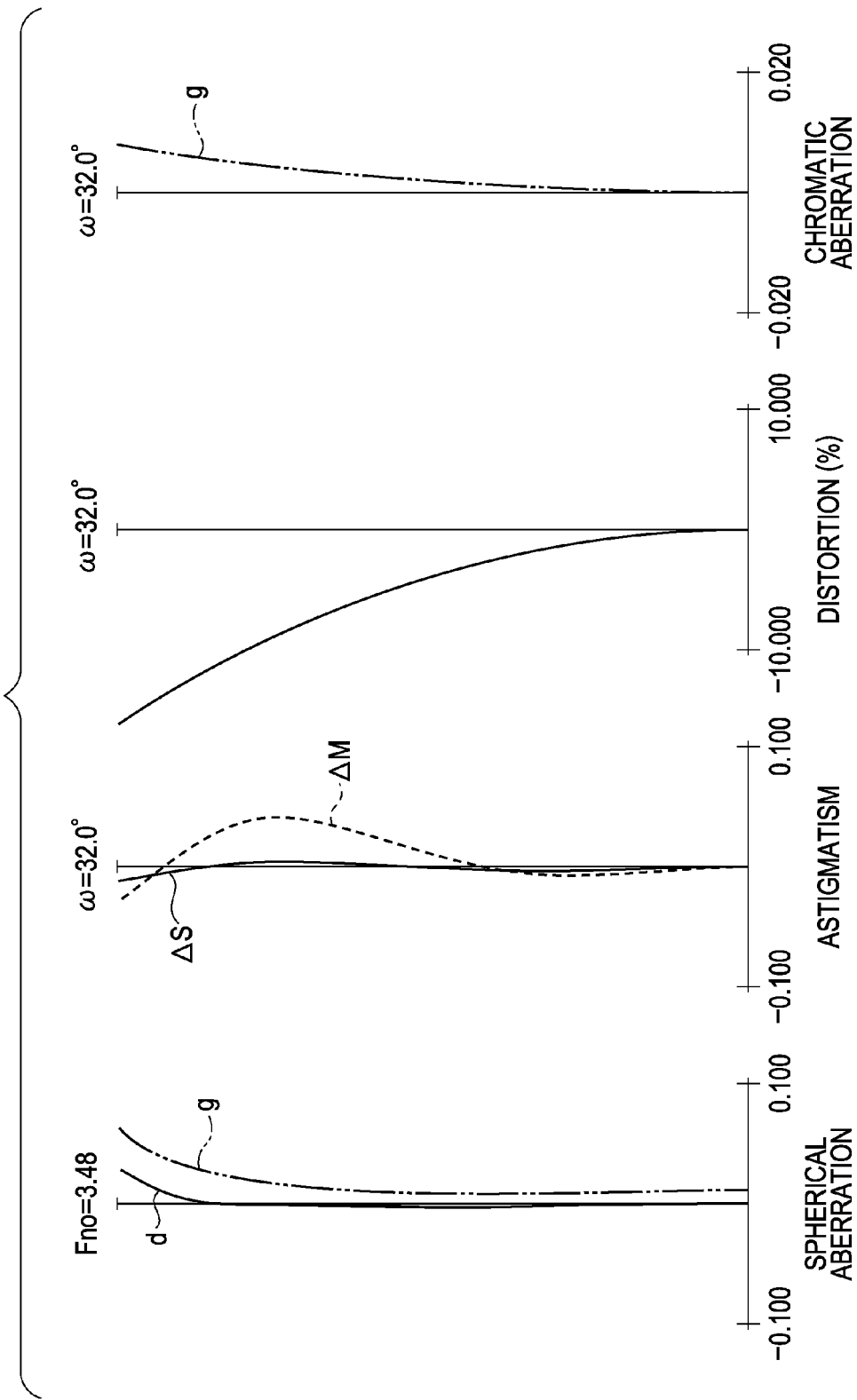

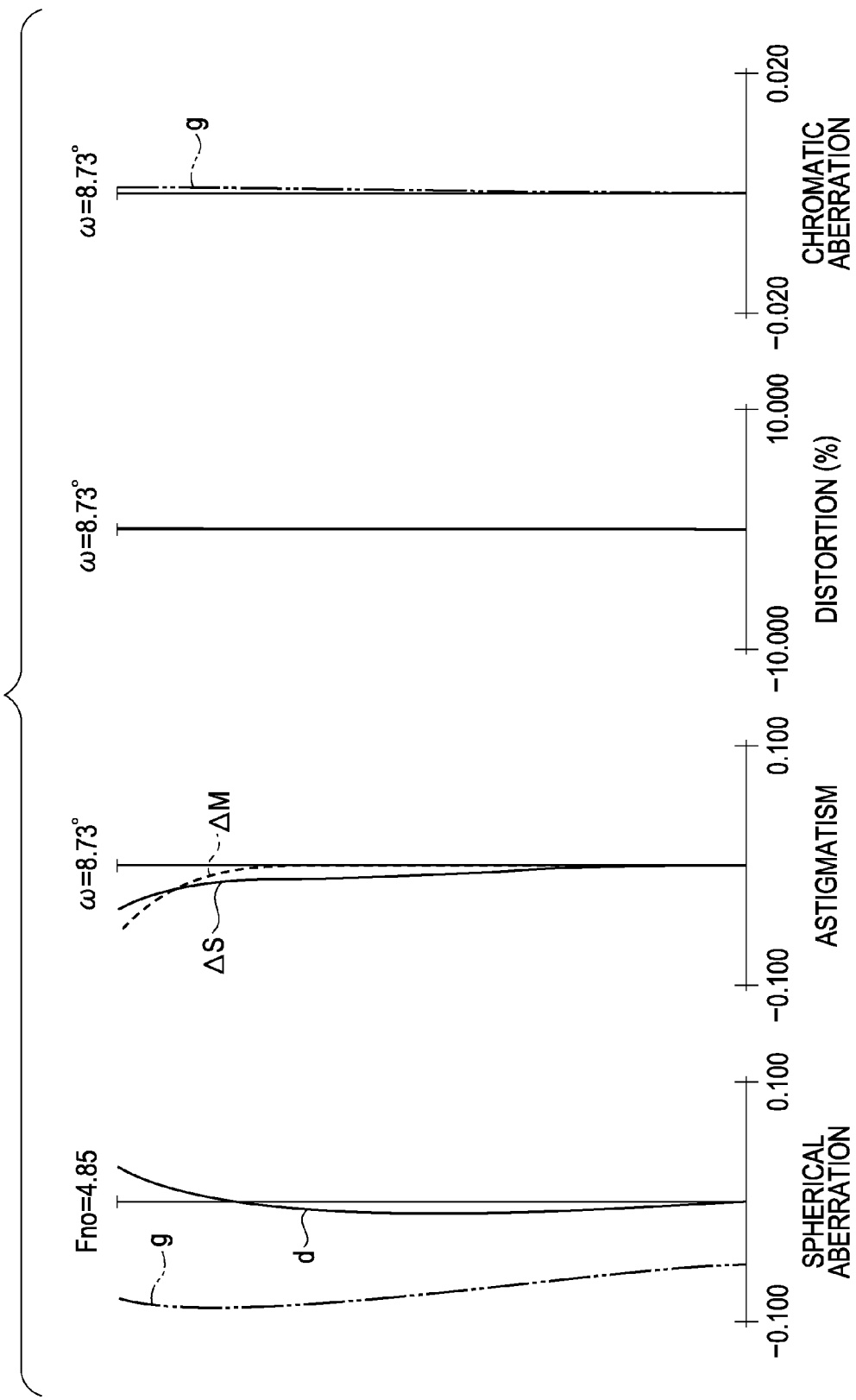

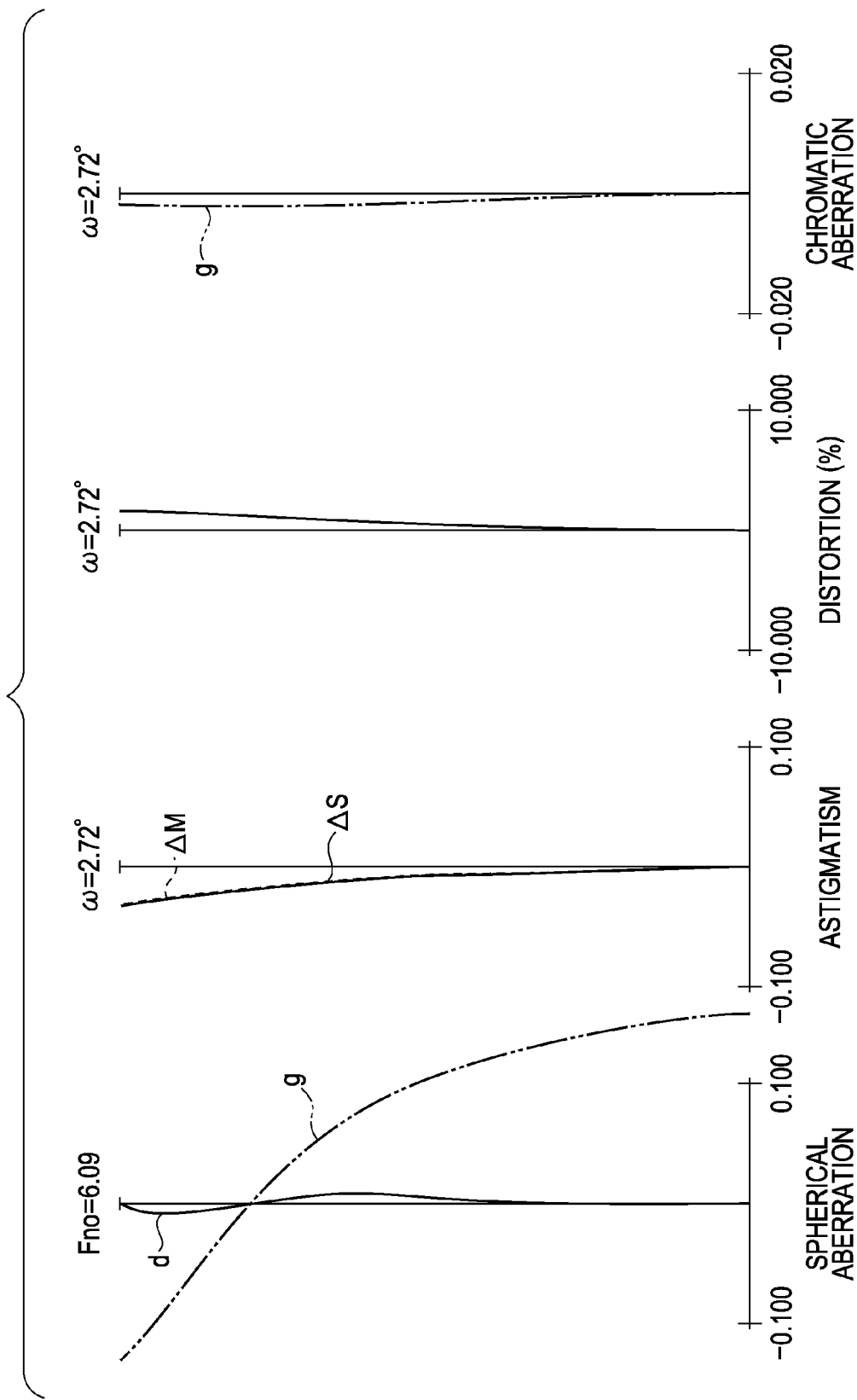

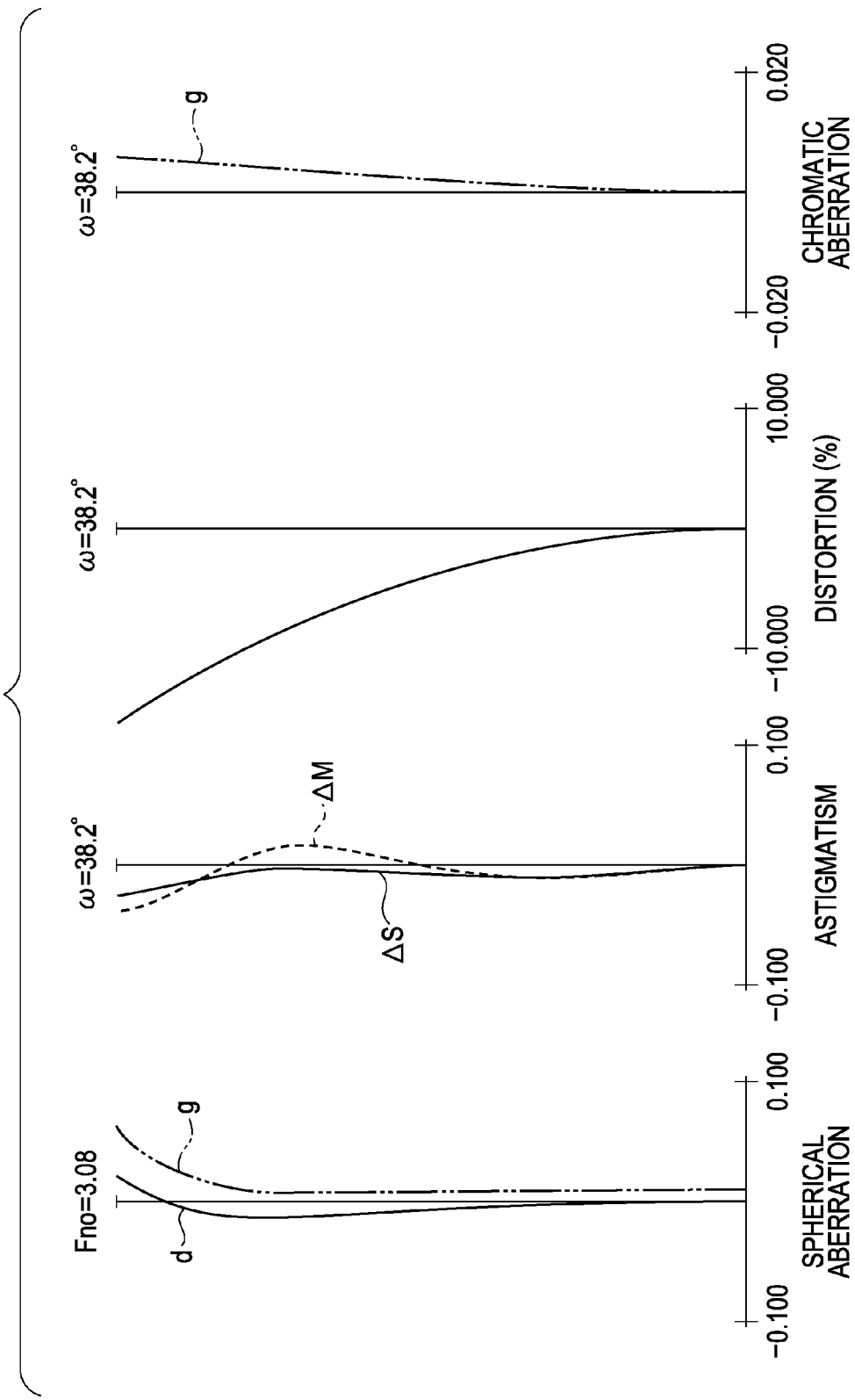

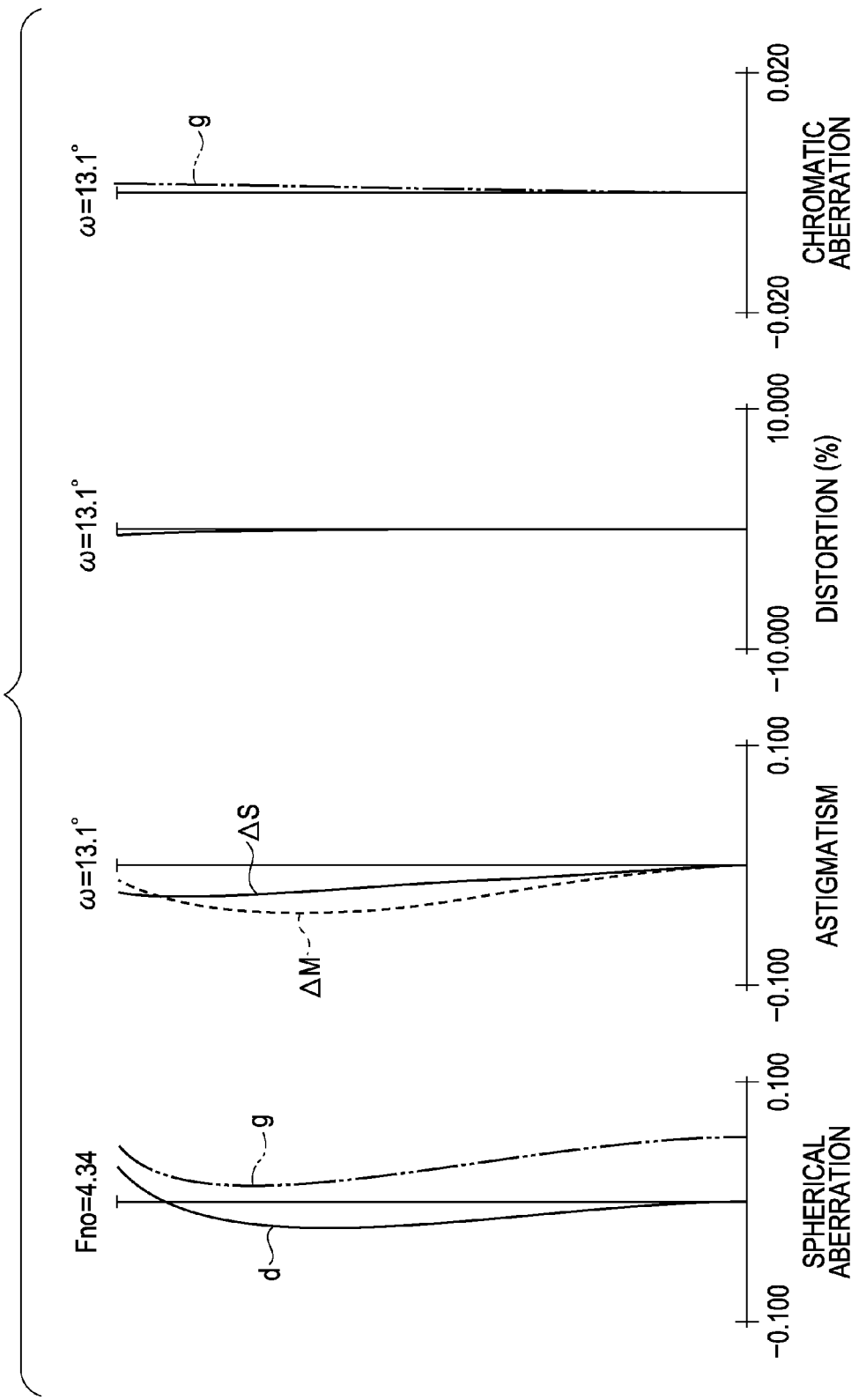

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens, and more particularly, to a zoom lens suitable for use in an image pickup apparatus using a solid-state image pickup element such as a video camera, an electronic still camera, a broadcast camera, or a surveillance camera, or an image pickup apparatus such as a camera using a silver-halide film.

2. Description of the Related Art

In recent years, image pickup apparatuses have continued to increase in functionality and decreased in size. As an imaging optical system for use in such an image pickup apparatus, there is a demand for a zoom lens having compact size, high zoom ratio, and high resolving power.

To achieve the desired compact size and to ensure a high zoom ratio in the zoom lens, the number of lenses in the lens units of the zoom lens is generally reduced while increasing the refractive powers of the lens units. In such a zoom lens, however, it is difficult to correct aberrations.

U.S. Pat. No. 6,449,433 and Japanese Patent Laid-Open No. 2004-117826 disclose zoom lenses in which five lens units respectively having positive, negative, positive, negative, and positive refractive powers are arranged in order from an object side to an image side. The side of a lens where an object to be imaged is placed can be referred to as the object side or front side of the lens; and the side of the lens where the image is formed can be referred to as the image side or back side of the lens.

To obtain high optical performance in such a five-unit zoom lens while achieving a high zoom ratio and a compact lens system, it is important to set the appropriate refractive powers of the lens units and to establish the correct moving parameters (conditions) of the lens units for zooming.

In particular, to obtain a high optical performance over the entire zoom range while ensuring a high zoom ratio of about 12, it is important to properly set the moving condition of the first lens unit for zooming and the refractive powers (the reciprocals of focal lengths) of the first and fourth lens units.

SUMMARY OF THE INVENTION

A zoom lens according to an aspect of the present invention includes a first lens unit having a positive refractive power; a second lens unit having a negative refractive power; a third lens unit having a positive refractive power; a fourth lens unit having a negative refractive power; and a fifth lens unit having a positive refractive power. The first, second, third, fourth, and fifth lens units are arranged in order from an object side to an image side. A distance between the first lens unit and the second lens unit is longer at a telephoto end than at a wide angle end, a distance between the second lens unit and the third lens unit is shorter at the telephoto end than at the wide angle end, a distance between the third lens unit and the fourth lens unit differs between the telephoto end and the wide angle end, and a distance between the fourth lens unit and the fifth lens unit is longer at the telephoto end than at the wide angle end. The following conditional expressions are satisfied:

$$4.0 < f1/fw < 15.0$$

$$1.00 < M1/TDw < -0.46$$

$$2.0 < |f4|/fw < 6.0$$

where f1 and f4 respectively represent focal lengths of the first lens unit and the fourth lens unit, fw represents a focal length of the entire zoom lens at the wide angle end, M1 represents a moving amount of the first lens unit during zooming from the wide angle end to the telephoto end (the sign of the moving amount M1 is positive when the first lens unit moves to the image side), and TDw represents a distance from a lens surface closest to the object side in the first lens unit to an image plane at the wide angle end.

According to the present invention, it is possible to obtain a compact zoom lens having a high zoom ratio, a small front-lens effective diameter, and a high optical performance over the entire zoom range.

Further features of the present invention will become apparent to a person having ordinary skill in the art from the following description of exemplary embodiments with reference to the attached drawings.

BRIEF DESCRIPTION OF THE DRAWINGS

FIGS. 2A, 2B, and 2C are aberration diagrams of the zoom lens of the first embodiment, respectively, at the wide angle end, the intermediate zoom position, and the telephoto end.

FIGS. 3A, 3B, and 3C are lens cross-sectional views of a zoom lens according to a second embodiment of the present invention, respectively, at a wide angle end, an intermediate zoom position, and a telephoto end.

FIGS. 4A, 4B, and 4C are aberration diagrams of the zoom lens of the second embodiment, respectively, at the wide angle end, the intermediate zoom position, and the telephoto end.

FIGS. 6A, 6B, and 6C are aberration diagrams of the zoom lens of the third embodiment, respectively, at the wide angle end, the intermediate zoom position, and the telephoto end.

FIGS. 8A, 8B, and 8C are aberration diagrams of the zoom lens of the fourth embodiment, respectively, at the wide angle end, the intermediate zoom position, and the telephoto end.

FIGS. 10A, 10B, and 10C are aberration diagrams of the zoom lens of the fifth embodiment, respectively, at the wide angle end, the intermediate zoom position, and the telephoto end.

DESCRIPTION OF THE EMBODIMENTS

Preferred embodiments of the present invention will be described in detail below with reference to the attached drawings. A zoom lens according to the present invention includes a first lens unit having a positive refractive power, a second lens unit having a negative refractive power, a third lens unit having a positive refractive power, a fourth lens unit having a negative refractive power, and a fifth lens unit having a positive refractive power. The first, second, third, fourth, and fifth lens units are arranged in order from an object side to an image side. The zoom lens units move for zooming so that a distance between the first lens unit and the second lens unit is longer at a telephoto end than at a wide angle end, a distance between the second lens unit and the third lens unit is shorter at the telephoto end than at the wide angle end, a distance between the third lens unit and the fourth lens unit differs between the telephoto end and the wide angle end, and a distance between the fourth lens unit and the fifth lens unit is longer at the telephoto end than at the wide angle end.

Figure 1A:
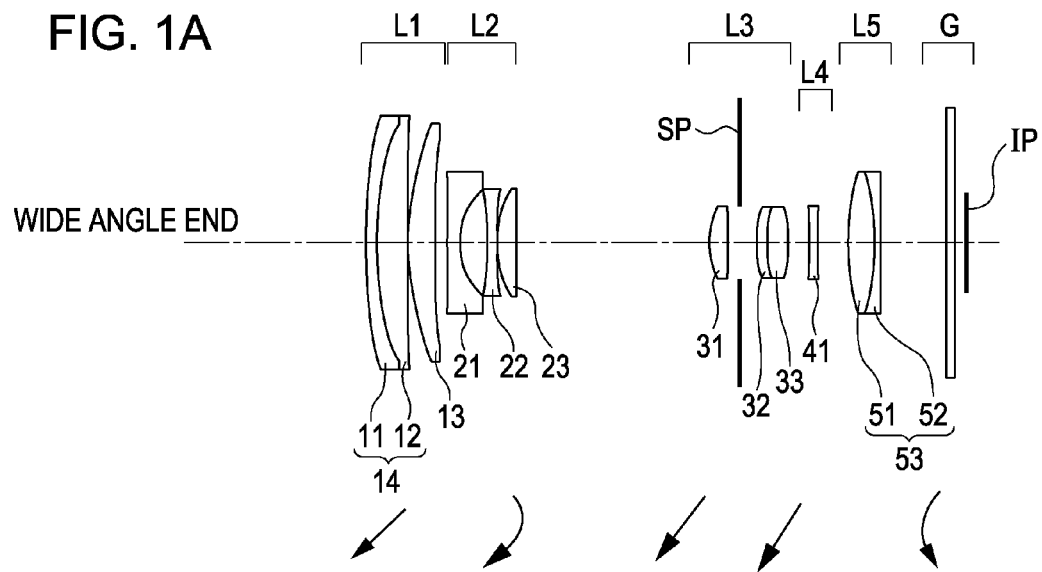
FIGS. 1A, 1B, and 1C are lens cross-sectional views of a zoom lens according to a first embodiment of the present invention, respectively, at a wide angle end, an intermediate zoom position, and a telephoto end.
Figure 1B:
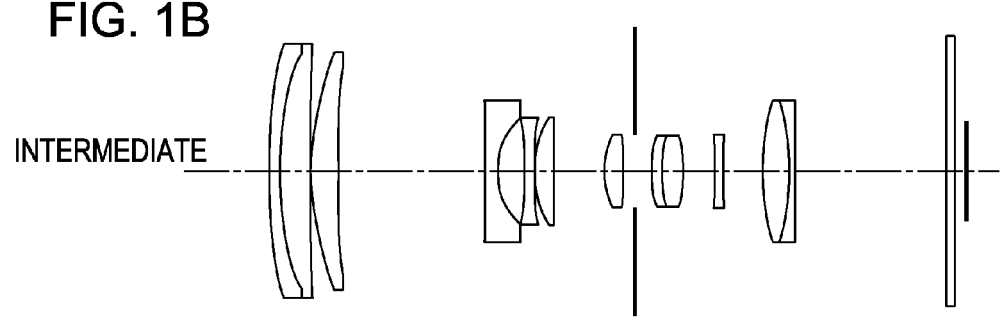
Figure 1C:
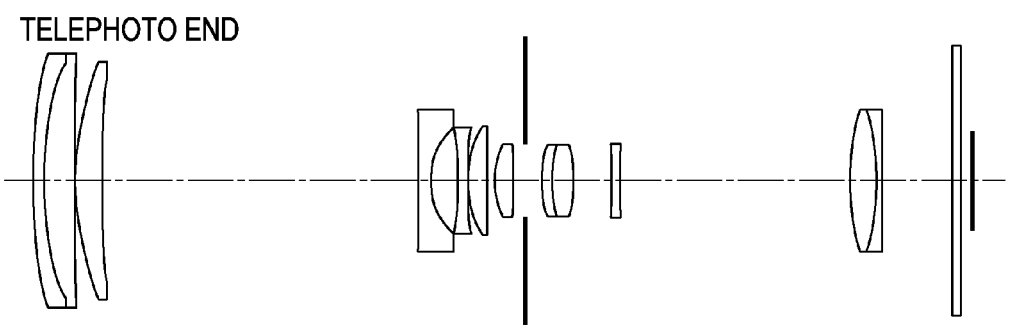

FIGS. 1A, 1B, and 1C are lens cross-sectional views of a zoom lens according to a first embodiment of the present invention, respectively, at a wide angle end (short focal-length end), an intermediate zoom position, and a telephoto end (long focal-length end). FIGS. 2A, 2B, and 2C are aberration diagrams of the zoom lens of the first embodiment, respectively, at the wide angle end, the intermediate zoom position, and the telephoto end. The zoom lens of the first embodiment has a zoom ratio of about 13.32 and an aperture ratio of about 3.21 to 6.08. FIGS. 3A, 3B, and 3C are lens cross-sectional views of a zoom lens according to a second embodiment of the present invention, respectively, at a wide angle end, an intermediate zoom position, and a telephoto end. FIGS. 4A, 4B, and 4C are aberration diagrams of the zoom lens of the second embodiment, respectively, at the wide angle end, the intermediate zoom position, and the telephoto end. The zoom lens of the second embodiment has a zoom ratio of about 13.32 and an aperture ratio of about 3.55 to 6.09.

Figure 5A:
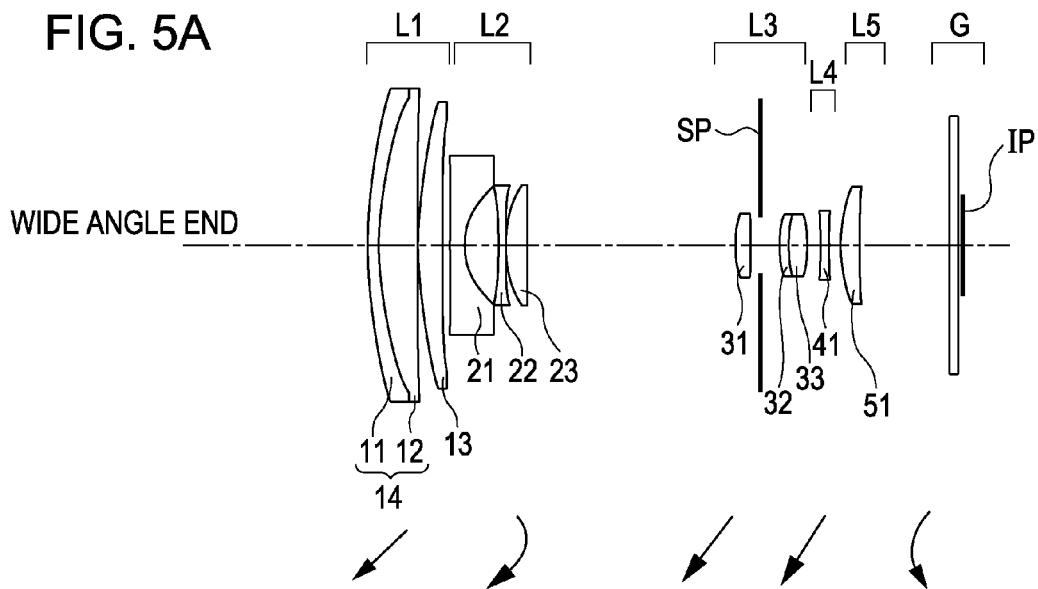
FIGS. 5A, 5B, and 5C are lens cross-sectional views of a zoom lens according to a third embodiment of the present invention, respectively, at a wide angle end, an intermediate zoom position, and a telephoto end.
Figure 5B:
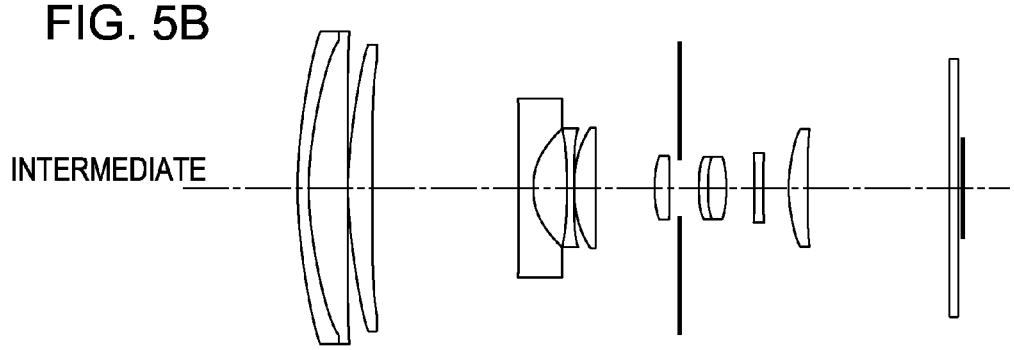
Figure 5C:
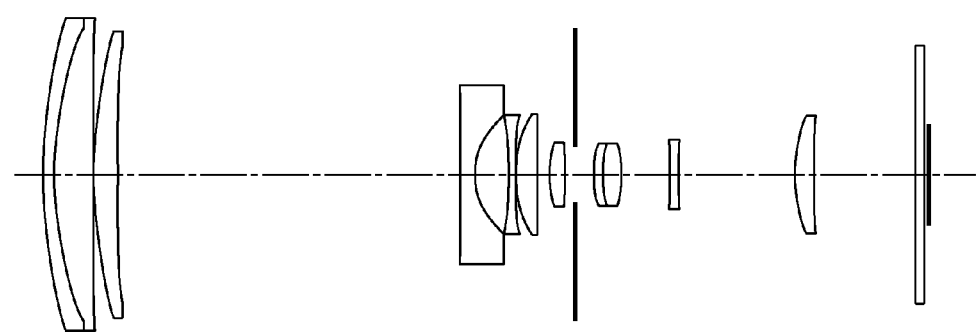
Figure 6A:
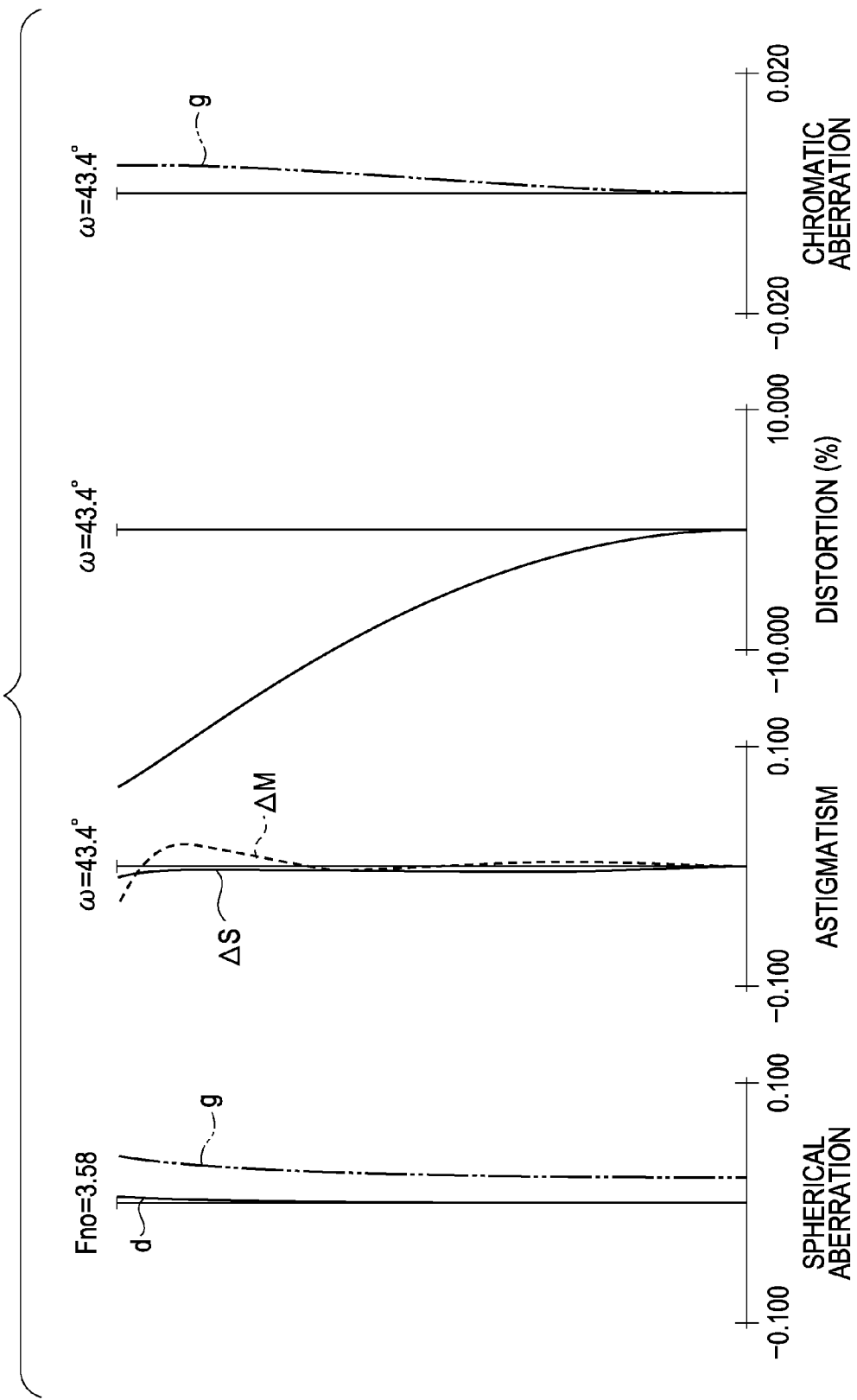
Figure 7A:
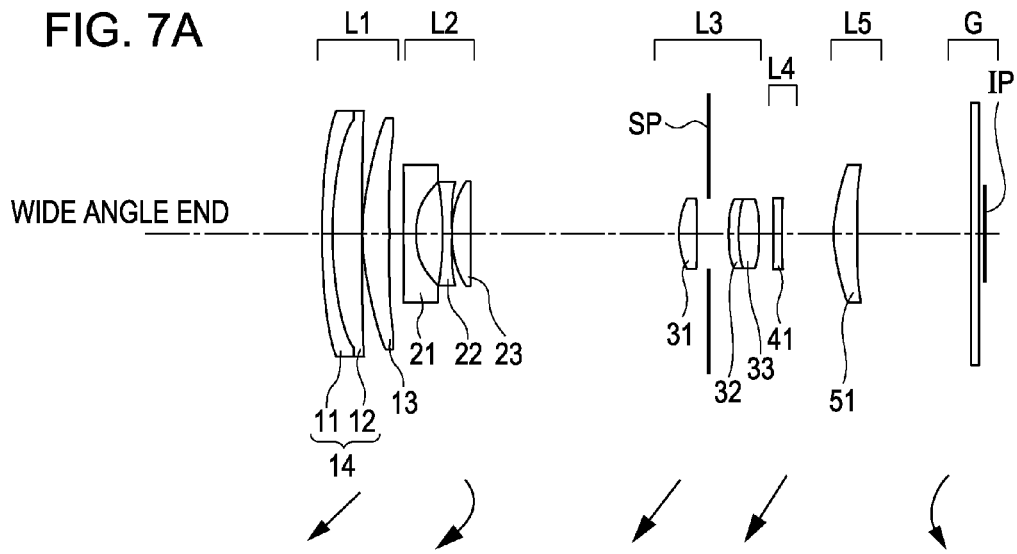
FIGS. 7A, 7B, and 7C are lens cross-sectional views of a zoom lens according to a fourth embodiment of the present invention, respectively, at a wide angle end, an intermediate zoom position, and a telephoto end.
Figure 7B:
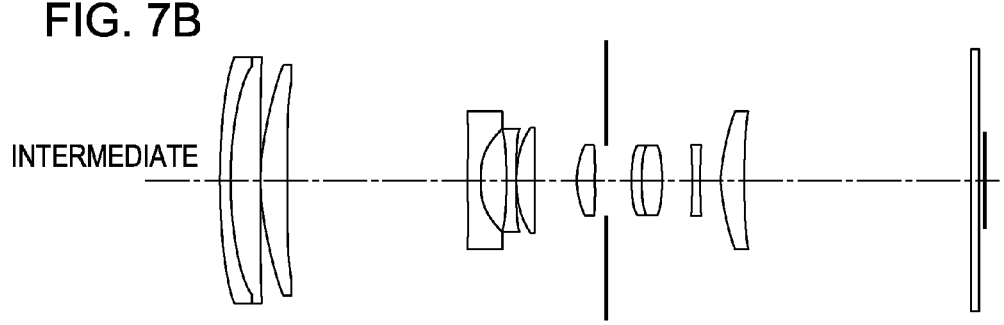
Figure 7C:
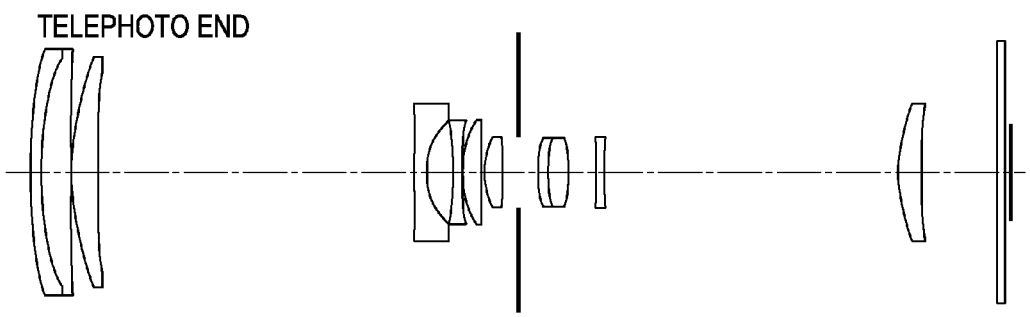
Figure 9A:
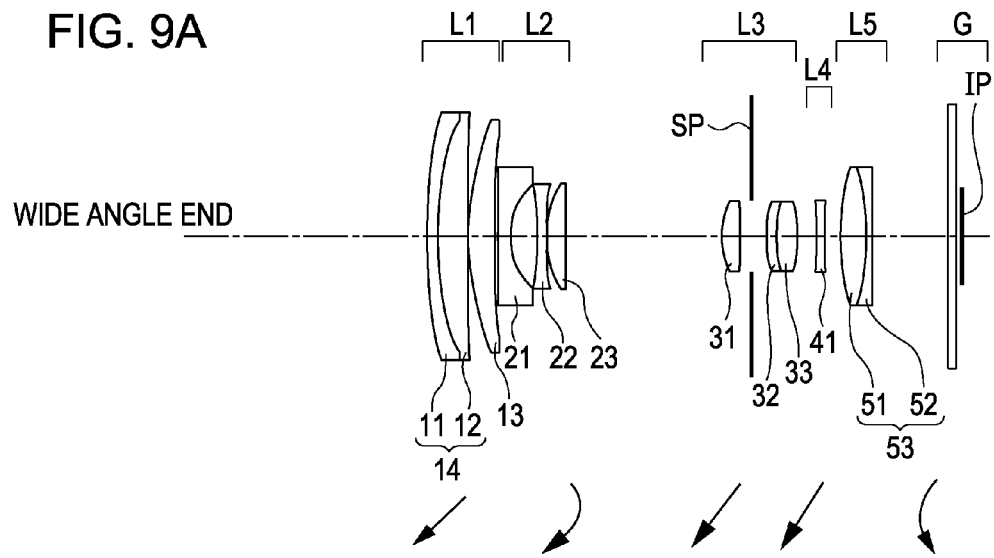
FIGS. 9A, 9B, and 9C are lens cross-sectional views of a zoom lens according to a fifth embodiment of the present invention, respectively, at a wide angle end, an intermediate zoom position, and a telephoto end.
Figure 9B:
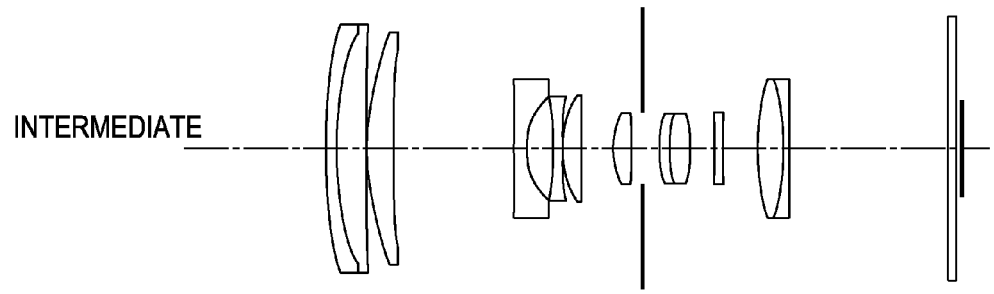
Figure 9C:
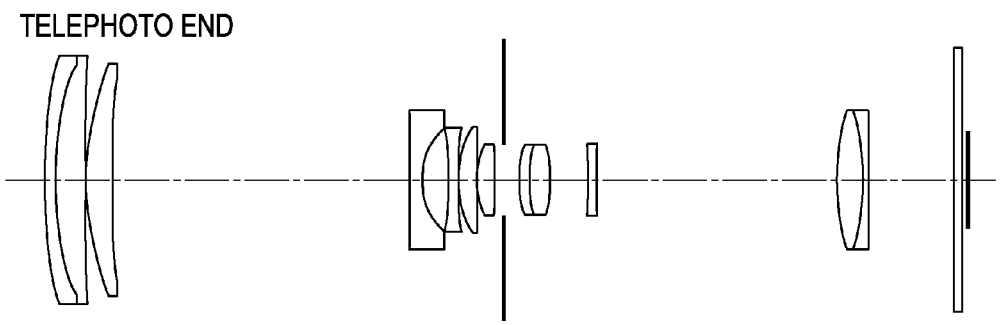
Figure 10C:
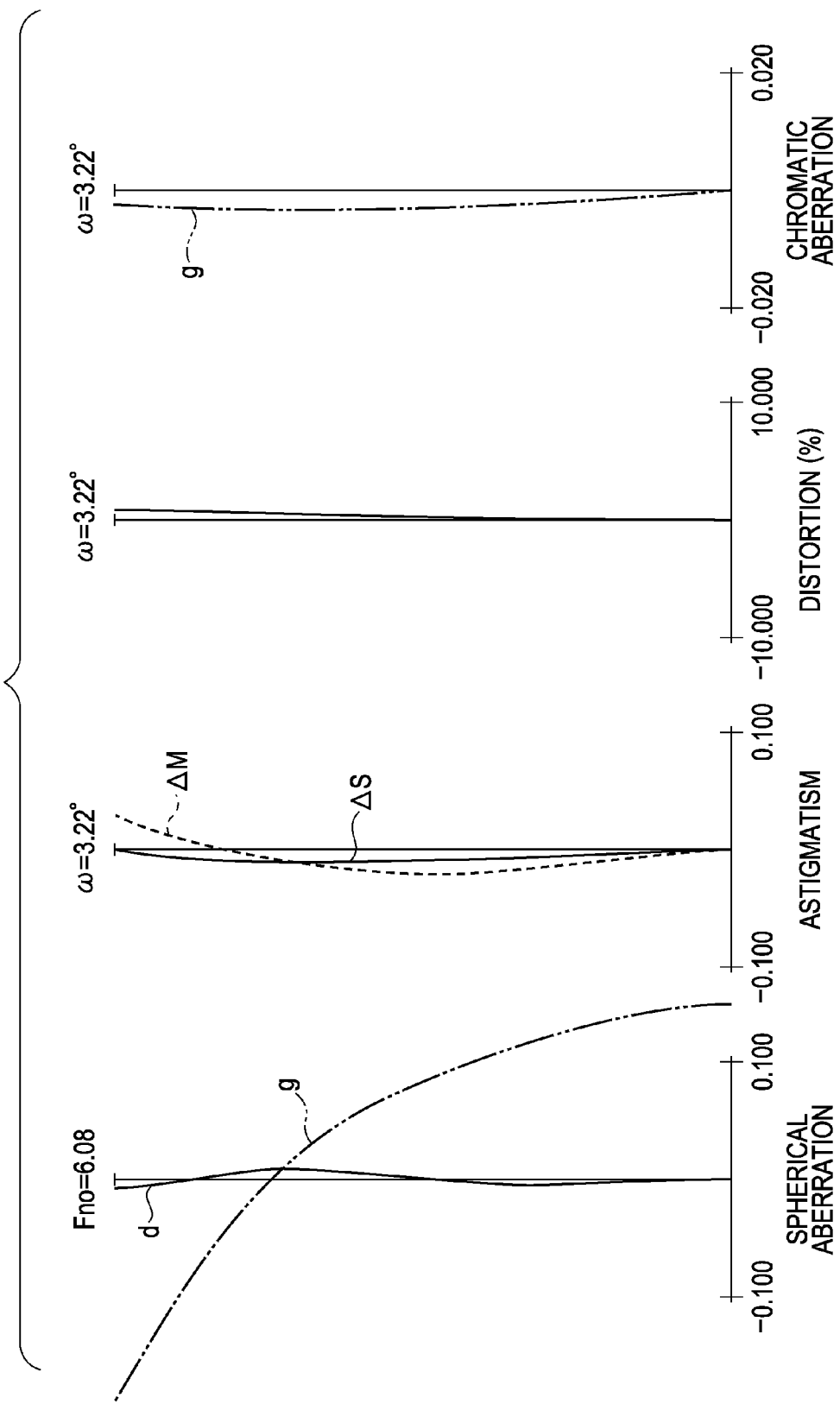
Figure 11:
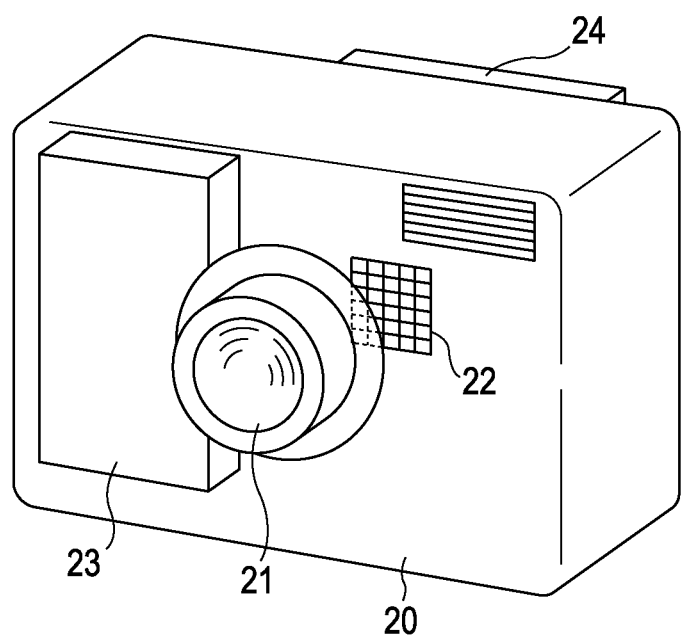
FIG. 11 is a schematic view illustrating the principal part of an image pickup apparatus according to the present invention.

FIGS. 5A, 5B, and 5C are lens cross-sectional views of a zoom lens according to a third embodiment of the present invention, respectively, at a wide angle end, an intermediate zoom position, and a telephoto end. FIGS. 6A, 6B, and 6C are aberration diagrams of the zoom lens of the third embodiment, respectively, at the wide angle end, the intermediate zoom position, and the telephoto end. The zoom lens of the third embodiment has a zoom ratio of about 11.53 and an aperture ratio of about 3.58 to 6.09. FIGS. 7A, 7B, and 7C are lens cross-sectional views of a zoom lens according to a fourth embodiment of the present invention, respectively, at a wide angle end, an intermediate zoom position, and a telephoto end. FIGS. 8A, 8B, and 8C are aberration diagrams of the zoom lens of the fourth embodiment, respectively, at the wide angle end, the intermediate zoom position, and the telephoto end. The zoom lens of the fourth embodiment has a zoom ratio of about 12.71 and an aperture ratio of about 3.48 to 6.09. FIGS. 9A, 9B, and 9C are lens cross-sectional views of a zoom lens according to a fifth embodiment of the present invention, respectively, at a wide angle end, an intermediate zoom position, and a telephoto end. FIGS. 10A, 10B, and 10C are aberration diagrams of the zoom lens of the fifth embodiment, respectively, at the wide angle end, the intermediate zoom position, and the telephoto end. The zoom lens of the fifth embodiment has a zoom ratio of about 13.61 and an aperture ratio of about 3.08 to 6.08. FIG. 11 is a schematic view illustrating the principal part of an image pickup apparatus according to the present invention.

The zoom lens of the present invention is used in an image pickup apparatus such as a digital camera, a video camera, or a silver-halide film camera, an observation apparatus such as a telescope or binoculars, and an optical apparatus such as a copying machine or a projector.

In the lens cross-sectional views, the left side is a front side (object side, enlargement side), and the right side is a rear side (image side, reduction side). Further, represents the order number of the lens unit counted from the object side, and Li represents an i-th lens unit.

In the lens cross-sectional views of the embodiments, L1 represents a first lens unit having a positive refractive power (optical power=the reciprocal of the focal length), L2 represents a second lens unit having a negative refractive power, L3 represents a third lens unit having a positive refractive power, L4 represents a fourth lens unit having a negative refractive power, and L5 represents a fifth lens unit having a positive refractive power. An f-number determining member (hereinafter also referred to as an "aperture stop") SP functions as an aperture stop that determines (limits) an open f-number (Fno) light beam, and is provided in the third lens unit L3. An optical block G corresponds to an optical filter, a face plate, a crystal low-pass filter, or an infrared cut-off filter. When the zoom lens is used as an imaging optical system for a video camera or a digital still camera, an image plane IP corresponds to an image pickup surface of a solid-state image pickup element (photoelectric conversion element, image pickup element) such as a CCD sensor or a CMOS sensor. When the zoom lens is used as an imaging optical system for a silver-halide film camera, the image plane IP corresponds to a photosensitive surface serving as a film surface.

In the aberration diagrams, d and g respectively represent a d-line and a g-line, $\Delta M$ and $\Delta S$ respectively represent a meridional image plane and a sagittal image plane, and lateral chromatic aberration is represented by the g-line.

In the zoom lenses of the embodiments, the lens units move during zooming from the wide angle end to the telephoto end so that the distance between the first lens unit L1 and the second lens unit L2 increases, the distance between the second lens unit L2 and the third lens unit L3 decreases, the distance between the third lens unit and the fourth lens unit L4 changes, and the distance between the fourth lens unit and the fifth lens unit increases. In this case, the first lens unit L1, the third lens unit L3, and the fourth lens unit L4 are located closer to the object side at the telephoto end than at the wide angle end. The second lens unit L2 moves to the image side along a convex path, and the fifth lens unit L5 moves to the object side along a convex path. Since the f-number determining member SP is provided in the third lens unit L3 in the optical axis direction, the distance between the second lens unit L2 and the third lens unit L3 can be reduced at the telephoto end. Hence, the distance between the second lens unit L2 and the third lens unit L3 can be sufficiently changed during zooming, and it is therefore possible to easily realize a zoom lens having a high zoom ratio.

In the zoom lenses of the embodiments, the refractive powers of the first lens unit L1 and the second lens unit L2 are relatively large, so that the distance between the first lens unit L1 and the aperture stop SP is short. This reduces the lens diameter of the first lens unit L1.

In addition, the refractive powers of the third lens unit L3 and the fifth lens unit L5 are relatively large, so that the distance from the aperture stop SP to the image plane IP is short. This reduces the total lens length (distance from the first lens surface to the image plane) at the wide angle end.

In the zoom lenses of the embodiments, during zooming from the wide angle end to the telephoto end, the zooming function is obtained by moving the first lens unit L1 to the object side so that the distance between the first lens unit L1 and the second lens unit L2 becomes longer at the telephoto end than at the wide angle end, by moving the third lens unit L3 to the object side so that the distance between the second lens unit L2 and the third lens unit L3 becomes shorter at the telephoto end than at the wide angle end, and by making the distance between the third lens unit L3 and the fourth lens unit L4 longer at the telephoto end than at the wide angle end. By thus sharing the zooming function at a plurality of positions between the lens units, the moving amounts for zooming are reduced while ensuring a high zoom ratio, and this reduces the total lens length at the telephoto end. Focus variation due to zooming is corrected by moving the fifth lens unit L5 to the object side along the convex path. Focusing from an object at infinity to a near object is performed by moving the first lens unit L1 or the fifth lens unit L5 to the object side.

With the above-described structures, the total lens length is reduced at the wide angle end and the telephoto end, and the zoom ratio is increased.

In the embodiments, to correct a motion blur (to perform image stabilization), an imaging position is shifted by moving an arbitrary lens unit in a manner such as to have a component in a direction perpendicular to the optical axis.

Next, the lens configurations of the lens units will be described. The first lens unit L1 includes, in order from the object side to the image side, a cemented lens 14 of a negative lens 11 and a positive lens 12, and a positive meniscus lens 13 having a convex surface on the object side. In the embodiments, the refractive power of the first lens unit L1 is relatively large so as to achieve a compact size and a high zoom ratio. In this case, however, aberrations occur in the first lens unit L1, in particular, much spherical aberration occurs on the telephoto side. Accordingly, in the embodiments, the positive refractive power of the first lens unit L1 is shared by the cemented lens 14 having a positive refractive power as a whole and the positive lens 13, thereby reducing these aberrations. The second lens unit L2 includes, in order from the object side to the image side, a negative lens 21 having a concave surface on the image side, a biconcave negative lens 22, and a positive lens 23 having a convex surface on the object side. In the embodiments, the refractive power of the second lens unit L2 is relatively large in order to reduce the size of the first lens unit L1 while obtaining a wide angle of view at the wide angle end. In this case, however, aberrations occur in the second lens unit L2, in particular, much curvature of field occurs on the wide angle side and much spherical aberration occurs on the telephoto side. Accordingly, in the embodiments, the negative refractive power of the second lens unit L2 is shared by the two negative lenses 21 and 22, thereby reducing these aberrations. With these lens configurations, the front-lens effective diameter is reduced and a high optical performance is obtained while achieving a wide angle of view.

The third lens unit L3 includes, in order from the object side to the image side, a positive lens 31 having a convex surface on the object side, a negative lens 32 having a concave surface on the image side, and a positive lens 33. In the embodiments, the refractive power of the third lens unit L3 is relatively large in order to enhance the zooming function of the third lens unit L3 and to reduce the total lens length at the wide angle end. In this case, however, aberrations occur in the third lens unit L3, in particular, much spherical aberration, coma aberration, and longitudinal chromatic aberration occur over the entire zoom range. Accordingly, in the embodiments, the positive refractive power of the third lens unit L3 is shared by two positive lenses, thereby reducing these aberrations. The fourth lens unit L4 is formed by only one negative lens 41. The fourth lens unit L4 formed by only one lens reduces the thickness and weight of the entire lens system.

Referring to FIGS. 1, 3, and 9, the fifth lens unit L5 is formed by a cemented lens 53 formed by cementing a positive lens 51 and a negative lens 52 arranged in order from the object side to the image side. The cemented lens 53 properly suppresses lateral chromatic aberration over the entire zoom range even when the refractive power of the fifth lens unit L5 is increased to some extent. Referring to FIGS. 5 and 7, the fifth lens unit L5 is formed by only one positive lens 51. Unless the refractive power of the fifth lens unit L5 is increased much, only one positive lens can suppress lateral chromatic aberration. In this case, the size and weight of the fifth lens unit L5 can be reduced easily. Particularly when focusing is performed by the fifth lens unit L5, it can be performed quickly and easily. The zoom lenses of the embodiments satisfy the following conditions:

$$4.0 < f1/fw < 15.0 \quad (1)$$

$$-1.00 < M1/TDw < -0.46 \quad (2)$$

$$2.0 < |f4|/fw < 6.0 \quad (3)$$

where f1 and f4 represent focal lengths of the first lens unit L1 and the fourth lens unit L4, fw represents a focal length of the entire zoom lens at the wide angle end, M1 represents a moving amount of the first lens unit L1 during zooming from the wide angle end to the telephoto end (the sign of the moving amount is positive when the first lens unit L1 moves to the image side), TDw represents a distance from a lens surface closest to the object side in the first lens unit L1 to the image plane at the wide angle end, and f4 represents a focal length of the fourth lens unit L4.

Conditional Expression (1) specifies the focal length, that is, the refractive power of the first lens unit L1. When the value exceeds the upper limit and the refractive power is too small, the zooming effect decreases. If the zooming function is compensated for by increasing the moving amount of the first lens unit L1 for zooming so as to obtain a high zoom ratio, the total lens length increases at the telephoto end. Further, if the zooming effect of the first lens unit L1 is compensated for by increasing the refractive power of the third lens unit L3, many aberrations, such as spherical aberration, coma aberration, and longitudinal chromatic aberration, occur. If the number of lenses in the first lens unit L1 is increased to correct aberrations, the thickness of the first lens unit L1 increases, and this makes size reduction difficult. In contrast, when the value falls below the lower limit in Conditional Expression (1) and the refractive power is too large, much spherical aberration is caused by the first lens unit L1 at the telephoto end. If the number of lenses in the first lens unit L1 is increased to correct spherical aberration at the telephoto end, the size of the first lens unit L1 and the front-lens effective diameter increase.

Conditional Expression (2) specifies the moving amount of the first lens unit L1 for zooming. When the value exceeds the upper limit and the moving amount to the object side is too small, the zooming effect decreases. If the zooming effect is compensated for by increasing the refractive power of the first lens unit L1, much spherical aberration occurs on the telephoto side. If the zooming effect is compensated for by increasing the refractive power of the second lens unit L2, much curvature of field occurs on the wide angle side, and much spherical aberration occurs on the telephoto side. Sometimes the distance TDw is long with respect to the moving amount M1, and the value exceeds the upper limit. In this case, the total lens length at the wide angle end increases, and the front-lens effective diameter increases. In contrast, when the value falls below the lower limit in Conditional Expression (2) and the moving amount to the object side is too large, the total lens length increases at the telephoto end, and it is therefore difficult to reduce the total size of the lens system.

Conditional Expression (3) specifies the focal length, that is, the refractive power of the fourth lens unit L4. When the value exceeds the upper limit and the refractive power is too small, the zooming effect decreases, and it is difficult to obtain a desired zoom ratio. In contrast, when the value falls below the lower limit and the refractive power is too large, much spherical aberration and longitudinal chromatic aberration occur. If the number of lenses is increased to correct these aberrations, the size of the fourth lens unit L4 increases. In the embodiment, it is more preferable to set the numerical ranges in Conditional Expressions (1) to (3) as follows:

$$5.0 < f1/fw < 13.0 \quad (1a)$$

$$0.90 < M1/TDw < -0.46 \quad (2a)$$

$$3.0 < |f4|/fw < 5.6 \quad (3a).$$

As described above, according to the embodiments, in the positive lead type zoom lens, the total lens length is short, the front-lens effective diameter is small, the zoom ratio is high, aberrations are properly corrected over the entire zoom range, and a high optical performance is obtained.

In the embodiments, it is more preferable to satisfy at least one of the following conditional expressions:

$$0.5 < |f2|/fw < 2.5 \quad (4)$$

$$1.0 < f3/fw < 3.0 \quad (5)$$

$$3.0 < f5/fw < 7.0 \quad (6)$$

$$0.03 < DL1/ft < 0.15 \quad (7)$$

$$0.03 < DL2/ft < 0.15 \quad (8)$$

$$-2.0 < (R1a+R1b)/(R1a-R1b) < -0.7 \quad (9)$$

$$0.5 < (R2a+R2b)/(R2a-R2b) < 1.2 \quad (10)$$

$$-0.7 < (R4a+R4b)/(R4a-R4b) < 0.2 \quad (11)$$

$$1.5 < (D45t-D45w)/fw < 4.3 \quad (12)$$

where f2, f3, and f5 represent focal lengths of the second, third, and fifth lens units L2, L3, and L5, DL1 represents a distance from a lens surface closest to the object side in the first lens unit L1 to a lens surface closest to the image side in the first lens unit L1, ft represents a focal length of the entire zoom lens at the telephoto end, DL2 represents a distance from a lens surface closest to the object side in the second lens unit L2 to a lens surface closest to the image side in the second lens unit L2, R1a represents a radius of curvature of a lens surface closest to the object side in a cemented lens that is formed by a negative lens and a positive lens and that is provided closest to the object side in the first lens unit L1, R1b represents a radius of curvature of a lens surface closest to the image side in the cemented lens, R2a represents a radius of curvature of an object-side lens surface of a negative lens closest to the object side in the second lens unit L2, R2b represents a radius of curvature of an image-side lens surface of the negative lens, R4a represents a radius of curvature of an object-side lens surface of one negative lens that forms the fourth lens unit L4, R4b represents a radius of curvature of an image-side lens surface of the negative lens, D45w represents a distance between the fourth lens unit L4 and the fifth lens unit L5 at the wide angle end, and D45t represents a distance between the fourth lens unit L4 and the fifth lens unit L5 at the telephoto end.

Conditional Expression (4) specifies the focal length, that is, the refractive power of the second lens unit L2. When the value exceeds the upper limit and the refractive power is too small, the zooming effect of the second lens unit L2 decreases, and it is therefore difficult to obtain a desired zoom ratio. In contrast, when the value falls below the lower limit and the refractive power is too large, much curvature of field is caused by the second lens unit L2 on the wide angle side and much spherical aberration is caused on the telephoto side.

Conditional Expression (5) specifies the focal length, that is, the refractive power of the third lens unit L3. When the value exceeds the upper limit and the refractive power is too small, the zooming effect of the third lens unit L3 decreases, and it is therefore difficult to obtain a desired zoom ratio. In contrast, when the value falls below the lower limit and the refractive power is too large, much spherical aberration, coma aberration, and longitudinal chromatic aberration are caused by the third lens unit L3.

Conditional Expression (6) specifies the focal length, that is, the refractive power of the fifth lens unit L5. When the value exceeds the upper limit and the refractive power is too small, the effect of correcting focus variation decreases, and the moving distance for focusing increases. This makes quick focusing difficult. In contrast, when the value falls below the lower limit and the refractive power is too large, the Petzval sum increases and much curvature of field occurs over the entire zoom range. If the curvature of field is suppressed by increasing the number of lenses, the weight of the lens increases, and this increases the torque for driving the fourth lens unit L4.

Conditional Expression (7) specifies the thickness of the first lens unit L1 in the optical axis direction. When the value exceeds the upper limit and the thickness is too large, the total lens length and the front-lens effective diameter increase. As a result, size reduction of the entire zoom lens is difficult. In contrast, when the value falls below the lower limit and the thickness is too small, it is difficult to increase the refractive power of the first lens unit L1 to some extent and to increase the zoom ratio.

Conditional Expression (8) specifies the thickness of the second lens unit L2 in the optical axis direction. When the value exceeds the upper limit and the thickness is too large, the total lens length and the front-lens effective diameter increase. This makes size reduction of the entire zoom lens difficult. In contrast, when the value falls below the lower limit and the thickness is too small, it is difficult to increase the refractive power of the second lens unit L2 to some extent and to increase the zoom ratio.

Conditional Expression (9) specifies the shape factor (lens shape) of the cemented lens 14 in the first lens unit L1. When the value in the expression is more than −1, the image-side lens surface is convex toward the image side. When the value exceeds the upper limit and the curvature of the image-side convex lens surface is too large, much curvature of field and lateral chromatic aberration occur on the wide angle side. When the value in the expression is less than −1, the lens is meniscus with the convex surface pointing toward the object side. When the value falls below the lower limit and the meniscus degree is too high, much spherical aberration occurs on the telephoto side.

Conditional Expression (10) specifies the shape factor of the negative lens 21 in the second lens unit L2. When the value in the expression is more than 1, the lens is meniscus with the concave surface pointing toward the image side. When the value exceeds the upper limit and the meniscus degree is too high, spherical aberration is overcorrected on the telephoto side. When the value in the expression is less than 0, the object-side concave lens surface points toward the object side. When the value falls below the lower limit and the curvature of the object-side lens surface is too large, much curvature of field and distortion occur on the wide angle side.

Conditional Expression (11) specifies the shape factor of the negative lens 41 in the fourth lens unit L4. When the value is more than 0, the image-side concave lens surface points toward the image side. When the value exceeds the upper limit and the curvature of the image-side lens surface is too large, a large astigmatic difference occurs in the off-axis light beam over the entire zoom range. In contrast, when the value is less than 0, the object-side concave lens surface points toward the object side. When the value falls below the lower limit and the curvature of the object-side lens surface is too large, much spherical aberration and longitudinal chromatic aberration occur over the entire zoom range.

Conditional Expression (12) specifies the change amount in distance between the fourth lens unit L4 and the fifth lens unit L5 during zooming. When the value exceeds the upper limit and the distance change amount is too large, the fifth lens unit L5 is located relatively close to the image side at the telephoto end. In this case, the lateral magnification of the fifth lens unit L5 increases, and the focus correction effect decreases. As a result, the moving amount for zooming increases, and this makes quick focusing difficult. In contrast, when the value falls below the lower limit and the distance change amount is too small, the fifth lens unit L5 is located relatively close to the object side at the telephoto end. In this case, the moving stroke of the fifth lens unit L5 during zooming from the wide angle end to the telephoto end increases, and therefore, the size of the driving means increases.

In the embodiments, it is more preferable to set the numerical ranges in Conditional Expressions (4) to (12) as follows:

$$0.8 < |f2|/fw < 2.0 \quad (4a)$$

$$1.3 \le f3/fw < 2.5 \quad (5a)$$

$$3.5 \le f5/fw < 6.5 \quad (6a)$$

$$0.05 < DL1/ft < 0.13 \quad (7a)$$

$$0.05 < DL2/ft < 0.13 \quad (8a)$$

$$-1.5 < (R1a + R1b)/(R1a - R1b) < -0.80 \quad (9a)$$

$$0.6 < (R2a + R2b)/(R2a - R2b) < 1.1 \quad (10a)$$

$$-0.6 < (R4a + R4b)/(R4a - R4b) < 0.1 \quad (11a)$$

$$1.7 < (D45t - D45w)/fw < 4.0 \quad (12a)$$

As described above, according to the embodiments, it is possible to obtain a positive lead type zoom lens that has a short total lens length, a small front-lens effective diameter, and a high zoom ratio and that is properly corrected for aberrations over the entire zoom range.

Numerical examples corresponding to the embodiments of the present invention will be described below. In the numerical examples, i represents the order number of the lens surface from the object side, ri represents the radius of curvature of the i-th lens surface from the object side, di represents the lens thickness and air gap between the i-th lens surface and the i+1-th lens surface from the object side, ndi and vdi respectively represent the refractive index and the Abbe number of the material of the i-th optical member from the object side for the d-line. When the i-th lens surface is aspherical, the aspherical shape for the i-th surface is given by the following expression:

$$X = \frac{(1/R)H^2}{1 + \sqrt{1 - (1+K)(H/R)^2}} + A4 \times H^4 +$$

$$A6 \times H^6 + A8 \times H^8 + A10 \times H^{10} + A12 \times H^{12}$$

where X represents a displacement distance in the optical axis direction, H represents a distance (or height) in a direction perpendicular to the optical axis, a light traveling direction is a positive direction, R represents the paraxial radius of curvature, K is a conical constant, and A4, A6, A8, A10, and A12 are aspherical coefficients. Further, [e+X] means [×10$^{+X}$], and [e−X] means [×10$^{−X}$]. BF represents the air conversion distance (back focus) from the final lens surface to the paraxial image plane. The total lens length is the sum of the distance from the foremost lens surface (first lens surface) to the final lens surface, and the back focus BF. The surface number of the aspherical lens surface is marked with "*". The relationships between the above-described conditional expressions and the numerical examples are shown in Table 1.

First Numerical Example

Unit: mm

| Surface Data | | | | Unit: mm |
|---|---|---|---|---|
| Surface No. | r | d | nd | vd |
| 1 | 47.198 | 0.90 | 1.84666 | 23.9 |
| 2 | 28.488 | 2.50 | 1.49700 | 81.5 |
| 3 | 539.546 | 0.20 | | |
| 4 | 27.858 | 1.95 | 1.69680 | 55.5 |
| 5 | 130.634 | (variable) | | |
| 6 | −142.993 | 1.03 | 1.85135 | 40.1 |
| 7* | 5.724 | 2.27 | | |
| 8 | −32.718 | 0.60 | 1.80400 | 46.6 |
| 9 | 20.754 | 0.20 | | |
| 10 | 10.630 | 1.40 | 1.94595 | 18.0 |
| 11 | 41.156 | (variable) | | |
| 12* | 7.790 | 1.40 | 1.58313 | 59.4 |
| 13* | −42.498 | 0.92 | | |
| 14(stop) | ∞ | 1.48 | | |
| 15 | 14.621 | 0.60 | 1.94595 | 18.0 |
| 16 | 7.752 | 0.51 | | |
| 17 | 38.232 | 1.45 | 1.60311 | 60.6 |
| 18 | −10.112 | (variable) | | |
| 19 | −22.588 | 0.50 | 1.48749 | 70.2 |
| 20 | 23.874 | (variable) | | |
| 21 | 15.072 | 2.00 | 1.69680 | 55.5 |
| 22 | −42.895 | 0.60 | 1.72825 | 28.5 |
| 23 | 240.459 | (variable) | | |
| 24 | ∞ | 0.80 | 1.51633 | 64.1 |
| 25 | ∞ | (variable) | | |
| Image Plane | ∞ | | | |

Aspherical Surface Data

Seventh Surface

K = −1.12918e+000 A4 = 7.09263e−004 A6 = 1.646978−005
A8 = −3.81294e−007 A10 = 1.794018−008

Twelfth Surface

K = −1.22101e+000 A4 = 4.95648e−005 A6 = 7.55352e−006
A8 = 3.03893e−006 A10 = −1.83896e−007

Thirteenth Surface

K = −1.36363e+002 A4 = 9.00236e−007 A6 = 2.00697e−005
A8 = 2.20070e−006 A10 = −1.36759e−007

Various Data
Zoom Ratio 13.32

| | Wide Angle | Intermediate | Telephoto |
|---|---|---|---|
| Focal length | 5.12 | 17.53 | 68.25 |
| F-number | 3.21 | 4.62 | 6.08 |
| Angle of view | 37.59 | 12.51 | 3.20 |
| Image height | 3.33 | 3.88 | 3.88 |
| Total lens length | 48.61 | 56.13 | 75.70 |
| BF | 6.95 | 13.90 | 7.26 |
| d5 | 0.95 | 11.54 | 25.33 |
| d11 | 15.79 | 4.21 | 0.71 |
| d18 | 1.90 | 2.57 | 3.04 |
| d20 | 2.51 | 3.39 | 18.85 |
| d23 | 5.52 | 12.48 | 5.84 |
| d25 | 0.90 | 0.90 | 0.90 |

Zoom Lens Unit Data

| Unit | First Surface | Focal Length |
|---|---|---|
| 1 | 1 | 41.07 |
| 2 | 6 | −6.74 |
| 3 | 12 | 10.27 |
| 4 | 19 | −23.73 |
| 5 | 21 | 23.41 |
| 6 | 24 | ∞ |

Second Numerical Example

Surface Data
Unit: mm

| Surface No. | r | d | nd | vd |
|---|---|---|---|---|
| 1 | 46.105 | 0.90 | 1.84666 | 23.9 |
| 2 | 28.149 | 2.50 | 1.49700 | 81.5 |
| 3 | −896.593 | 0.20 | | |
| 4 | 29.174 | 1.95 | 1.69680 | 55.5 |
| 5 | 133.477 | (variable) | | |
| 6 | −107.677 | 1.03 | 1.85135 | 40.1 |
| 7* | 5.781 | 2.23 | | |
| 8 | −25.388 | 0.60 | 1.80400 | 46.6 |
| 9 | 19.958 | 0.20 | | |
| 10 | 10.787 | 1.40 | 1.94595 | 18.0 |
| 11 | 48.530 | (variable) | | |
| 12* | 8.020 | 1.40 | 1.58313 | 59.4 |
| 13* | −43.077 | 0.92 | | |
| 14(stop) | ∞ | 1.48 | | |
| 15 | 14.032 | 0.60 | 1.94595 | 18.0 |
| 16 | 7.726 | 0.37 | | |
| 17 | 28.459 | 1.45 | 1.60311 | 60.6 |
| 18 | −11.506 | (variable) | | |
| 19 | −21.561 | 0.50 | 1.48749 | 70.2 |
| 20 | 34.086 | (variable) | | |
| 21 | 16.262 | 2.00 | 1.69680 | 55.5 |
| 22 | −35.941 | 0.60 | 1.72825 | 28.5 |
| 23 | −616.530 | (variable) | | |
| 24 | ∞ | 0.80 | 1.51633 | 64.1 |
| 25 | ∞ | (variable) | | |
| Image Plane | ∞ | | | |

Aspherical Surface Data

Seventh Surface

K = −1.09648e+000 A4 = 7.01327e−004 A6 = 1.67084e−005
A8 = −4.05009e−007 A10 = 2.30460e−008

Twelfth Surface

K = −1.13386e+000 A4 = 5.16885e−005 A6 = −3.63367e−006
A8 = 3.63312e−006 A10 = −1.67540e−007

Thirteenth Surface

K = −1.42198e+002 A4 = −3.07739e−005 A6 = 8.68663e−006
A8 = 2.96062e−006 A10 = −1.33285e−007

Various Data
Zoom Ratio 13.32

| | Wide Angle End | Intermediate | Telephoto |
|---|---|---|---|
| Focal length | 5.13 | 14.29 | 68.26 |
| F-number | 3.55 | 4.56 | 6.09 |
| Angle of view | 37.53 | 15.37 | 3.21 |
| Image height | 3.33 | 3.88 | 3.88 |
| Total lens length | 51.12 | 56.53 | 75.12 |
| BF | 5.21 | 12.85 | 8.17 |
| d5 | 0.97 | 8.78 | 24.55 |
| d11 | 16.79 | 5.54 | 0.52 |
| d18 | 1.90 | 2.05 | 4.62 |
| d20 | 5.93 | 6.98 | 16.94 |
| d23 | 4.28 | 11.92 | 7.24 |
| d25 | 0.40 | 0.40 | 0.40 |

Zoom Lens Unit Data

| Unit | First Surface | Focal Length |
|---|---|---|
| 1 | 1 | 39.90 |
| 2 | 6 | −6.36 |
| 3 | 12 | 10.36 |
| 4 | 19 | −27.01 |
| 5 | 21 | 23.19 |
| 6 | 24 | ∞ |

Third Numerical Example

Surface Data
Unit: mm

| Surface No. | r | d | nd | vd |
|---|---|---|---|---|
| 1 | 41.718 | 1.00 | 1.84666 | 23.9 |
| 2 | 28.350 | 3.00 | 1.49700 | 81.5 |
| 3 | 270.615 | 0.10 | | |
| 4 | 37.070 | 2.00 | 1.69680 | 55.5 |
| 5 | 198.718 | (variable) | | |
| 6 | −19399.678 | 1.03 | 1.85135 | 40.1 |
| 7* | 5.891 | 2.84 | | |
| 8 | −35.292 | 0.60 | 1.80400 | 46.6 |
| 9 | 19.252 | 0.20 | | |
| 10 | 10.873 | 1.40 | 1.94595 | 18.0 |
| 11 | 38.100 | (variable) | | |
| 12* | 7.535 | 1.40 | 1.58313 | 59.4 |
| 13* | −39.703 | 0.92 | | |
| 14(stop) | ∞ | 1.48 | | |
| 15 | 16.098 | 0.60 | 1.94595 | 18.0 |
| 16 | 7.574 | 0.29 | | |
| 17 | 29.633 | 1.45 | 1.60311 | 60.6 |
| 18 | −9.543 | (variable) | | |
| 19 | −25.546 | 0.50 | 1.48749 | 70.2 |
| 20 | 21.446 | (variable) | | |
| 21 | 13.911 | 1.60 | 1.69680 | 55.5 |
| 22 | 63.769 | (variable) | | |
| 23 | ∞ | 0.80 | 1.51633 | 64.1 |
| 24 | ∞ | (variable) | | |
| Image Plane | ∞ | | | |

Aspherical Surface Data

Seventh Surface

K = −1.10287e+000 A4 = 6.93044e−004 A6 = 1.62873e−005
A8 = −3.39845e−007 A10 = 1.85149e−008

Twelfth Surface

K = −1.40191e+000 A4 = 6.64943e−005 A6 = 3.39935e−006
A8 = 3.85620e−007 A10 = 2.94359e−008

Thirteenth Surface

K = −1.23906e+002 A4 = −4.48665e−005 A6 = 1.24540e−005
A8 = 6.51078e−008 A10 = 4.76659e−008

Various Data
Zoom Ratio 11.53

|  | Wide Angle End | Intermediate | Telephoto |
|---|---|---|---|
| Focal length | 4.40 | 14.86 | 50.75 |
| F-number | 3.58 | 5.03 | 6.09 |
| Angle of view | 43.44 | 14.53 | 4.30 |
| Image height | 3.33 | 3.88 | 3.88 |
| Total lens length | 48.63 | 54.86 | 72.66 |
| BF | 8.14 | 13.00 | 9.57 |
| d5 | 0.70 | 12.08 | 27.83 |
| d11 | 17.29 | 4.88 | 1.02 |
| d18 | 1.00 | 2.36 | 4.21 |
| d20 | 1.09 | 2.13 | 9.62 |
| d22 | 7.21 | 12.07 | 8.64 |
| d24 | 0.40 | 0.40 | 0.40 |

Zoom Lens Unit Data

| Unit | First Surface | Focal Length |
|---|---|---|
| 1 | 1 | 47.00 |
| 2 | 6 | −6.87 |
| 3 | 12 | 9.96 |
| 4 | 19 | −23.83 |
| 5 | 21 | 25.20 |
| 6 | 23 | ∞ |

Fourth Numerical Example

Surface Data
Unit: mm

| Surface No. | r | d | nd | vd |
|---|---|---|---|---|
| 1 | 45.137 | 0.80 | 1.84666 | 23.9 |
| 2 | 26.751 | 2.00 | 1.49700 | 81.5 |
| 3 | 316.073 | 0.20 | | |
| 4 | 25.509 | 1.80 | 1.69680 | 55.5 |
| 5 | 138.290 | (variable) | | |
| 6 | −45.848 | 0.90 | 1.85135 | 40.1 |
| 7* | 6.967 | 1.51 | | |
| 8 | −26.682 | 0.60 | 1.80400 | 46.6 |
| 9 | 19.054 | 0.20 | | |
| 10 | 10.997 | 1.20 | 1.94595 | 18.0 |
| 11 | 64.566 | (variable) | | |
| 12* | 7.931 | 1.40 | 1.58313 | 59.4 |
| 13* | −49.743 | 0.92 | | |
| 14(stop) | ∞ | 1.48 | | |
| 15 | 15.005 | 0.60 | 1.94595 | 18.0 |
| 16 | 7.889 | 0.42 | | |
| 17 | 28.965 | 1.45 | 1.60311 | 60.6 |
| 18 | −11.148 | (variable) | | |
| 19 | −18.255 | 0.50 | 1.48749 | 70.2 |
| 20 | 31.033 | (variable) | | |
| 21 | 14.715 | 1.80 | 1.69680 | 55.5 |
| 22 | 95.464 | (variable) | | |
| 23 | ∞ | 0.80 | 1.51633 | 64.1 |
| 24 | ∞ | (variable) | | |
| Image Plane | ∞ | | | |

Aspherical Surface Data

Seventh Surface

K = −1.69260e+000 A4 = 7.35961e−004 A6 = 4.02138e−006
A8 = 4.27135e−007 A10 = −1.82160e−008
Twelfth Surface K = −1.35343e+000 A4 = 5.70480e−005 A6 = 3.68881e−006
A8 = 3.75286e−006 A10 = −2.39096e−007
Thirteenth Surface K = −1.55159e+002 A4 = −4.68124e−005 A6 = 1.55281e−005
A8 = 2.92922e−006 A10 = −2.03532e−007

Various Data
Zoom Ratio 12.71

|  | Wide Angle End | Intermediate | Telephoto |
|---|---|---|---|
| Focal length | 6.29 | 25.29 | 80.00 |
| F-number | 3.48 | 4.85 | 6.09 |
| Angle of view | 32.02 | 8.73 | 2.72 |
| Image height | 3.33 | 3.88 | 3.88 |
| Total lens length | 48.34 | 55.92 | 71.61 |
| BF | 9.25 | 17.42 | 6.13 |
| d5 | 1.14 | 13.69 | 23.74 |
| d11 | 15.48 | 3.43 | 0.50 |
| d18 | 1.00 | 2.11 | 1.82 |
| d20 | 3.69 | 1.50 | 21.63 |
| d22 | 8.32 | 16.49 | 5.21 |
| d24 | 0.40 | 0.40 | 0.40 |

Zoom Lens Unit Data

| Unit | First Surface | Focal Length |
|---|---|---|
| 1 | 1 | 38.00 |
| 2 | 6 | −7.19 |
| 3 | 12 | 10.52 |
| 4 | 19 | −23.50 |
| 5 | 21 | 24.74 |
| 6 | 23 | ∞ |

Fifth Numerical Example

Surface Data
Unit: mm

| Surface No. | r | d | nd | vd |
|---|---|---|---|---|
| 1 | 46.956 | 0.90 | 1.84666 | 23.9 |
| 2 | 28.657 | 2.40 | 1.49700 | 81.5 |
| 3 | 383.163 | 0.20 | | |
| 4 | 28.893 | 1.95 | 1.69680 | 55.5 |
| 5 | 126.728 | (variable) | | |
| 6 | −112.475 | 0.95 | 1.85135 | 40.1 |
| 7* | 5.364 | 2.13 | | |
| 8 | −34.451 | 0.60 | 1.80400 | 46.6 |
| 9 | 19.993 | 0.20 | | |
| 10 | 10.523 | 1.30 | 1.92286 | 18.9 |
| 11 | 59.521 | (variable) | | |
| 12* | 7.637 | 1.40 | 1.58313 | 59.4 |
| 13* | −48.324 | 0.92 | | |
| 14(stop) | ∞ | 1.48 | | |
| 15 | 13.710 | 0.60 | 1.94595 | 18.0 |
| 16 | 7.544 | 0.48 | | |
| 17 | 60.712 | 1.45 | 1.60311 | 60.6 |
| 18 | −9.339 | (variable) | | |
| 19 | −15.865 | 0.50 | 1.48749 | 70.2 |
| 20 | 45.081 | (variable) | | |
| 21 | 17.556 | 2.20 | 1.69680 | 55.5 |
| 22 | −32.092 | 0.60 | 1.92286 | 18.9 |
| 23 | −67.453 | (variable) | | |
| 24 | ∞ | 0.80 | 1.51633 | 64.1 |
| 25 | ∞ | (variable) | | |
| Image Plane | ∞ | | | |

Aspherical Surface Data

Seventh Surface

K = −1.08028e+000 A4 = 7.05087e−004 A6 = 2.09739e−005
A8 = −7.34249e−007 A10 = 2.84558e−008
Twelfth Surface K = −1.42301e+000 A4 = 8.27856e−005 A6 = 1.64853e−005
A8 = 2.43605e−006 A10 = −2.21873e−007
Thirteenth Surface K = −1.65690e+002 A4 = 1.77865e−005 A6 = 2.70905e−005
A8 = 1.92902e−006 A10 = −2.07273e−007

-continued

Various Data
Zoom Ratio 13.61

|  | Wide Angle End | Intermediate | Telephoto |
|---|---|---|---|
| Focal length | 5.01 | 16.66 | 68.25 |
| F-number | 3.08 | 4.34 | 6.08 |
| Angle of view | 38.19 | 13.13 | 3.22 |
| Image height | 3.33 | 3.88 | 3.88 |
| Total lens length | 46.71 | 55.70 | 80.72 |
| BF | 7.63 | 14.77 | 8.37 |
| d5 | 0.69 | 11.39 | 26.74 |
| d11 | 14.63 | 3.75 | 0.69 |
| d18 | 1.90 | 2.45 | 3.59 |
| d20 | 1.60 | 3.07 | 21.07 |
| d23 | 6.70 | 13.85 | 7.44 |
| d25 | 0.40 | 0.40 | 0.40 |

Zoom Lens Unit Data

| Surface | First Surface | Focal Length |
|---|---|---|
| 1 | 1 | 43.29 |
| 2 | 6 | −6.64 |
| 3 | 12 | 10.25 |
| 4 | 19 | −24.01 |
| 5 | 21 | 21.81 |
| 6 | 24 | ∞ |

The relationships between the above-described conditional expressions and the numerical values in the numerical examples are shown in Table 1.

TABLE 1

|  | First Example | Second Example | Third Example | Fourth Example | Fifth Example |
|---|---|---|---|---|---|
| Conditional Expression (1) | 8.02 | 7.78 | 10.68 | 6.04 | 8.63 |
| Conditional Expression (2) | −0.55 | −0.47 | −0.49 | −0.48 | −0.72 |
| Conditional Expression (3) | 4.63 | 5.27 | 5.42 | 3.73 | 4.79 |
| Conditional Expression (4) | 1.31 | 1.24 | 1.56 | 1.14 | 1.32 |
| Conditional Expression (5) | 2.00 | 2.02 | 2.26 | 1.67 | 2.04 |
| Conditional Expression (6) | 4.57 | 4.52 | 5.73 | 3.93 | 4.35 |
| Conditional Expression (7) | 0.08 | 0.08 | 0.12 | 0.06 | 0.08 |
| Conditional Expression (8) | 0.08 | 0.08 | 0.12 | 0.06 | 0.08 |
| Conditional Expression (9) | −1.19 | −0.90 | −1.36 | −1.33 | −1.28 |
| Conditional Expression (10) | 0.92 | 0.90 | 1.00 | 0.74 | 0.91 |
| Conditional Expression (11) | −0.03 | −0.23 | 0.09 | −0.26 | −0.48 |
| Conditional Expression (12) | 3.19 | 2.15 | 1.94 | 2.85 | 3.88 |

Next, a description will be given of an example of a digital still camera using the zoom lens of any of the embodiments as an imaging optical system, with reference to FIG. 11. Referring to FIG. 11, the exemplary digital still camera includes a camera body 20, an imaging optical system 21 formed by the zoom lens of any of the first to fifth embodiments, a solid-state image pickup element (photoelectric conversion element) 22, such as a CCD sensor or a CMOS sensor, incorporated in the camera body 20 so as to receive an object image formed by the imaging optical system 21, a memory 23 for recording information about the object image photoelectrically converted by the image pickup element 22, and a viewfinder 24 formed by a liquid crystal display panel or the like. The object image formed on the solid-state image pickup element 22 is viewed through the viewfinder 24. By thus applying the zoom lens of the present invention to an image pickup apparatus such as a digital still camera, the image pickup apparatus can have a compact size and high optical performance.

While the present invention has been described with reference to exemplary embodiments, it is to be understood that the invention is not limited to the disclosed exemplary embodiments. The scope of the following claims is to be accorded the broadest reasonable interpretation so as to encompass all modifications and equivalent structures and functions.

This application claims the benefit of Japanese Patent Application No. 2009-183428 filed Aug. 6, 2009, which is hereby incorporated by reference herein in its entirety.

What is claimed is:

1. A zoom lens comprising:
a first lens unit having a positive refractive power;
a second lens unit having a negative refractive power;
a third lens unit having a positive refractive power;
a fourth lens unit having a negative refractive power; and
a fifth lens unit having a positive refractive power,
wherein the first, second, third, fourth, and fifth lens units are arranged in order from an object side to an image side,
wherein a distance between the first lens unit and the second lens unit is longer at a telephoto end than at a wide angle end, a distance between the second lens unit and the third lens unit is shorter at the telephoto end than at the wide angle end, a distance between the third lens unit and the fourth lens unit differs between the telephoto end and the wide angle end, and a distance between the fourth lens unit and the fifth lens unit is longer at the telephoto end than at the wide angle end, and
wherein the following conditional expressions are satisfied:

$$4.0 < f1/fw < 15.0$$

$$-1.00 < M1/TDw < -0.46$$

$$2.0 < |f4|/fw < 6.0$$

where f1 and f4 represent focal lengths of the first lens unit and the fourth lens unit, fw represents a focal length of the entire zoom lens at the wide angle end, M1 represents a moving amount of the first lens unit during zooming from the wide angle end to the telephoto end, a sign of the moving amount M1 is positive when the first lens unit moves to the image side, and TDw represents a distance from a lens surface closest to the object side in the first lens unit to an image plane at the wide angle end,
wherein the moving amount M1 of the first lens unit during zooming from the wide angle end to the telephoto end corresponds to a difference between a total length of the zoom lens at the wide angle end and a total length of the zoom lens at the telephoto end.

2. The zoom lens according to claim 1, wherein the following conditional expression is satisfied:

$$0.5 < |f2|/fw < 2.5$$

where f2 represents a focal length of the second lens unit.

3. The zoom lens according to claim 1, wherein the following conditional expression is satisfied:

$$1.0 < f3/fw < 3.0$$

where f3 represents a focal length of the third lens unit.

4. The zoom lens according to claim 1, wherein the following conditional expression is satisfied:

$$3.0 < f5/fw < 7.0$$

where f5 represents a focal length of the fifth lens unit.

5. The zoom lens according to claim 1, wherein the following conditional expression is satisfied:

$$0.03 < DL1/ft < 0.15$$

where DL1 represents a distance from a lens surface closest to the object side in the first lens unit to a lens surface closest to the image side in the first lens unit, and ft represents a focal length of the entire zoom lens at the telephoto end.

6. The zoom lens according to claim 1, wherein the following conditional expression is satisfied:

$$0.03 < DL2/ft < 0.15$$

where DL2 represents a distance from a lens surface closest to the object side in the second lens unit to a lens surface closest to the image side in the second lens unit, and ft represents a focal length of the entire zoom lens at the telephoto end.

7. The zoom lens according to claim 1,
wherein the first lens unit includes a cemented lens formed by cementing a negative lens and a positive lens, and the cemented lens is closest to the object side in the first lens unit, and
wherein the following conditional expression is satisfied:

$$-2.0 < (R1a+R1b)/(R1a-R1b) < -0.7$$

where R1a represents a radius of curvature of a lens surface closest to the object side in the cemented lens, and R1b represents a radius of curvature of a lens surface closest to the image side in the cemented lens.

8. The zoom lens according to claim 1,
wherein the second lens unit includes a negative lens on a side closest to the object side, and
wherein the following conditional expression is satisfied:

$$0.5 < (R2a+R2b)/(R2a-R2b) < 1.2$$

where R2a represents a radius of curvature of an object-side lens surface of the negative lens, and R2b represents a radius of curvature of an image-side lens surface of the negative lens.

9. The zoom lens according to claim 1,
wherein the fourth lens unit is formed by one negative lens, and
wherein the following conditional expression is satisfied:

$$-0.7 < (R4a+R4b)/(R4a-R4b) < 0.2$$

where R4a represents a radius of curvature of an object-side lens surface of the negative lens, and R4b represents a radius of curvature of an image-side lens surface of the negative lens.

10. The zoom lens according to claim 1, wherein the following conditional expression is satisfied:

$$1.5 < (D45t-D45w)/fw < 4.3$$

where D45w represents distance between the fourth lens unit and the fifth lens unit at the wide angle end, and D45t represents a distance between the fourth lens unit and the fifth lens unit at the telephoto end.

11. The zoom lens according to claim 1, wherein the total length of the zoom lens at the wide angle end is the distance from the lens surface closest to the object side in the first lens unit to the image plane at the wide angle end, and the total length of the zoom lens at the telephoto end is a distance from the lens surface closest to the object side in the first lens unit to the image plane at the telephoto end.

12. The zoom lens according to claim 1, wherein, during zooming from the wide angle end to the telephoto end, each of the lens units moves so that a distance between the first lens unit and the second lens unit increases, a distance between the second lens unit and the third lens unit decreases, a distance between the third lens unit and the fourth lens unit changes, and a distance between the fourth lens unit and the fifth lens unit increases.

13. The zoom lens according to claim 1, wherein, during zooming from the wide angle end to the telephoto end, the second lens unit moves to the image side along a convex path, and the fifth lens unit moves to the object side along a convex path.

14. The zoom lens according to claim 1, wherein, during zooming from the wide angle end to the telephoto end,
the first lens unit moves to the object side so that the distance between the first lens unit and the second lens unit becomes longer at the telephoto end than at the wide angle end, and
the third lens unit moves to the object side so that the distance between the second lens unit and the third lens unit becomes shorter at the telephoto end than at the wide angle end, and the distance between the third lens unit and the fourth lens unit becomes longer at the telephoto end than at the wide angle end.

15. An image pickup apparatus comprising:
a zoom lens; and
a solid-state image pickup element configured to receive an image formed by the zoom lens,
wherein the zoom lens includes
a first lens unit having a positive refractive power,
a second lens unit having a negative refractive power,
a third lens unit having a positive refractive power,
a fourth lens unit having a negative refractive power, and
a fifth lens unit having a positive refractive power,
wherein the first, second, third, fourth, and fifth lens units are arranged in order from an object side to an image side,
wherein, during zooming from a wide angle end to a telephoto end, a distance between the first lens unit and the second lens unit increases, a distance between the second lens unit and the third lens unit decreases, a distance between the third lens unit and the fourth lens unit changes, and a distance between the fourth lens unit and the fifth lens unit increases, and
wherein the following conditional expressions are satisfied:

$$4.0 < f1/fw < 15.0$$

$$-1.00 < M1/TDw < -0.46$$

$$2.0 < |f4|/fw < 6.0$$

where f1 and f4 represent focal lengths of the first lens unit and the fourth lens unit, fw represents a focal length of the entire zoom lens at the wide angle end, M1 represents a moving amount of the first lens unit during zooming from the wide angle end to the telephoto end, a sign of the moving amount M1 is positive when the first lens unit moves to the image side, and TDw represents a distance from a lens surface closest to the object side in the first lens unit to an image plane at the wide angle end,
wherein the moving amount M1 of the first lens unit during zooming from the wide angle end to the telephoto end corresponds to a difference between a total length of the zoom lens at the wide angle end and a total length of the zoom lens at the telephoto end.

* * * * *